(12) United States Patent
Okamura

(10) Patent No.: US 7,688,903 B2
(45) Date of Patent: Mar. 30, 2010

(54) MULTICARRIER TRANSMISSION APPARATUS AND METHOD

(75) Inventor: Yusaku Okamura, Tokyo (JP)

(73) Assignee: NEC Corporation, Tokyo (JP)

( * ) Notice: Subject to any disclaimer, the term of this patent is extended or adjusted under 35 U.S.C. 154(b) by 1064 days.

(21) Appl. No.: 11/293,147

(22) Filed: Dec. 5, 2005

(65) Prior Publication Data

US 2006/0120445 A1    Jun. 8, 2006

(30) Foreign Application Priority Data

Dec. 7, 2004    (JP) ............................. 2004-354004

(51) Int. Cl.
 H04K 1/10      (2006.01)
 H04L 27/28     (2006.01)
(52) U.S. Cl. ...................................... 375/260
(58) Field of Classification Search ......... 375/224–227, 375/259–261, 285, 295–296, 346, 349; 370/206, 370/210, 464, 480
 See application file for complete search history.

(56) References Cited

U.S. PATENT DOCUMENTS

| 6,205,410 | B1 * | 3/2001 | Cai ............................. 375/260 |
| 6,510,184 | B1 | 1/2003 | Okamura |
| 6,516,027 | B1 * | 2/2003 | Kapoor et al. .............. 375/227 |
| 6,574,282 | B1 | 6/2003 | Okado |
| 6,580,752 | B1 | 6/2003 | Amrany et al. |
| 6,658,024 | B1 * | 12/2003 | Okamura .................... 370/468 |
| 6,714,520 | B1 | 3/2004 | Okamura |
| 6,834,109 | B1 | 12/2004 | Pare, Jr. et al. |
| 7,274,743 | B2 * | 9/2007 | Kim ............................ 375/260 |
| 2004/0105465 | A1 | 6/2004 | Gross et al. |
| 2005/0083972 | A1 * | 4/2005 | Tzannes et al. ............. 370/468 |
| 2005/0271153 | A1 * | 12/2005 | Okamura et al. ........... 375/260 |
| 2006/0209894 | A1 * | 9/2006 | Tzannes et al. ............. 370/468 |

FOREIGN PATENT DOCUMENTS

| EP | 0 955 744 A2 | 11/1999 |
| EP | 1 030 490 | 8/2000 |
| EP | 1 030 490 A2 | 8/2000 |
| GB | 2 303 032 A | 2/1997 |
| JP | 3319422 | 6/2002 |
| JP | 3348719 | 9/2002 |

* cited by examiner

Primary Examiner—Jean B Corrielus
(74) Attorney, Agent, or Firm—Foley & Lardner LLP

(57) ABSTRACT

A bit-power distribution ratio calculation unit measures several times an SNR of periodic noise occurring on a communication line to calculate several times, according to the measurement results of the SNR thus measured, a bit distribution ratio to be assigned to each carrier for data transmission for each measurement result. The calculation unit compares the calculated bit distribution ratios with each other to detect a minimum bit value of each carrier to calculate, according to the detected minimum bit values of the respective carriers, a minimum bit distribution ratio including the minimum bit value of each carrier. The calculation unit delivers the minimum bit distribution ratio to a demapping unit and a mapping unit, which conduct data transmission using the minimum bit distribution ratio. Therefore, a multicarrier transmission device can efficiently conduct multicarrier transmission even at occurrence of non-periodic noise.

24 Claims, 27 Drawing Sheets

FIG. 8 PRIOR ART
 FEXTr DATA SYMBOL
 NEXTr DATA SYMBOL

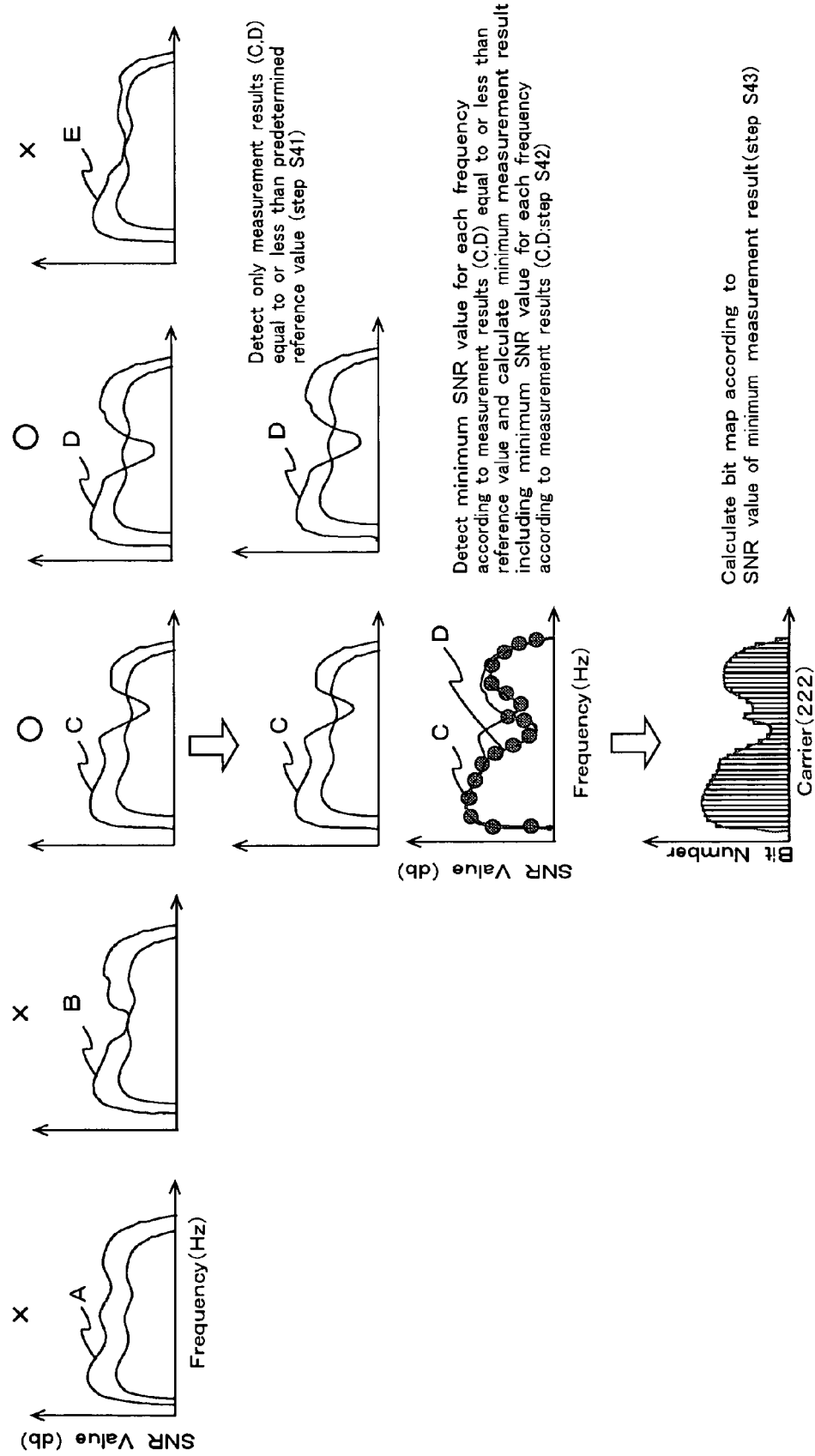

FIG. 26

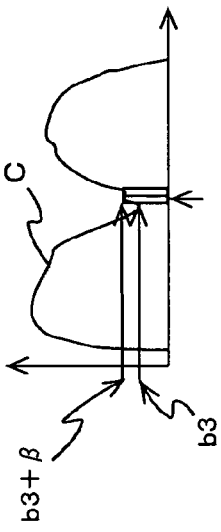
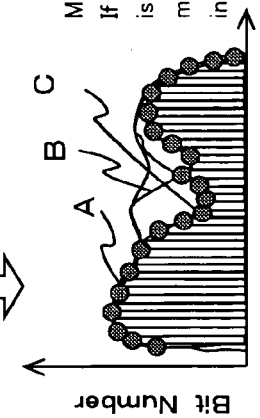

Bit values b1, b2, and b3 of A, B, and C in carrier a are compared with each other to select minimum bit value b3. If difference between b3 and mean bit value b for carrier a (b=(b1+b2+b3)/3) is equal to or more than predetermined $\alpha$, that is, $|b-b3| \geq \alpha$, predetermined value $\beta$ is added to minimum bit value b3 to attain (b3+$\beta$) to thereby correct minimum bit value Minimum bit value is detected for each carrier. If difference between detected minimum bit value and mean bit value is equal to or more than predetermined value minimum bit value is corrected to calculate minimum bit map including minimum bit value for each carrier or corrected minimum bit value

FIG. 27

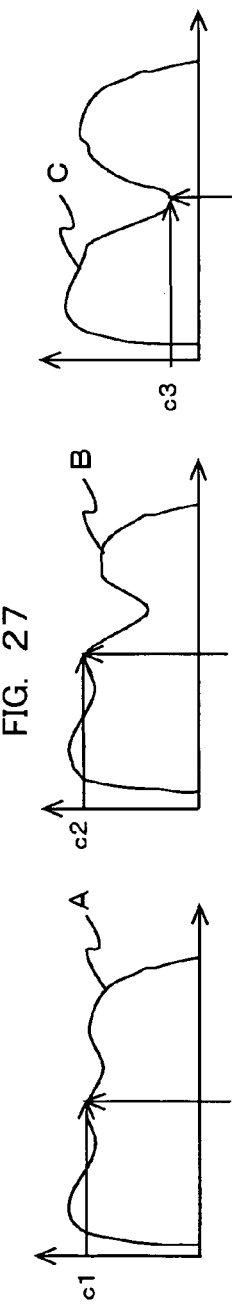
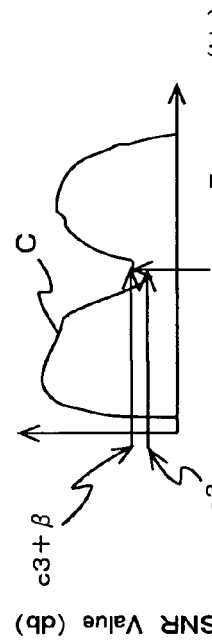

SNR values c1,c2, and c3 of A,B, and C in frequency a are compared with each other to select minimum SNR value c3. If difference (error) between c3 and mean SNR value c in frequency a $(c=(c1+c2+c3)/3)$ is equal to or more than predetermined value $\alpha$, that is, $|c-c3| \geq \alpha$, predetermined value $\beta$ is added to minimum SNR value c3 to obtain $(c3+\beta)$ to thereby correct minimum SNR value c3

Minimum SNR value is detected for each frequency.
If difference (error) between detected minimum SNR value and mean SNR value is equal to or more than predetermined value minimum SNR value is corrected to calculate minimum measurement result including minimum SNR value for each frequency or corrected minimum SNR value

MULTICARRIER TRANSMISSION APPARATUS AND METHOD

BACKGROUND OF THE INVENTION

1. Field of the Invention

The present invention relates to a multicarrier transmission apparatus and a multicarrier transmission method for use with an x Digital Subscriber Line (xDSL; x represents A, S, V, and the like) to conduct data transmission through a metallic cable such as a telephone line at a high transmission rate of several megabits per second, and in particular, to a multicarrier transmission apparatus and a multicarrier transmission method to conduct data transmission at a high transmission rate in an environment in which noise occurs abruptly.

2. Description of the Prior Art

Recently, attention has been drawn to an xDSL technique capable of accomplishing data transmission at a high transmission rate of several megabits per second using a metallic cable such as a telephone line. Especially, an Asymmetric Digital Subscriber Line (ADSL) has collected attention. On the ADSL, a forward or upstream line and a reverse or downstream line adopt mutually different transmission rates. The asymmetric characteristic is suitable for the access to the Internet.

Referring now to FIG. 1, description will be given of a system configuration of a general ADSL transmission system.

As can be seen from FIG. 1, the ADSL transmission system includes ADSL subscriber equipment 100, a subscriber telephone 101, a splitter 102 on the subscriber side, ADSL office equipment 104, and a splitter 106 on the office side.

The ADSL subscriber equipment 100 is connected via the splitter 102 on the subscriber side to a line 103. The subscriber telephone 101 is linked via the splitter 102 on the subscriber side to the line 103.

The ADSL office equipment 104 is connected via the splitter 106 on the office side to the line 103. The exchange 105 is linked via the splitter 106 on the office side to the line 103.

The splitters 102 and 106 are used to split signals on the line 103 into telephone signals and data signals for ADSL.

The splitter 102 on the subscriber side is coupled with the subscriber telephone 101 side when the signal on the line 103 is a telephone signal and with the ADSL subscriber equipment 100 when the signal is an ADSL data signal.

The splitter 106 on the office side is connected to the exchange 105 side when the signal on the line 103 is a telephone signal and with the ADSL office equipment 104 when the signal is an ADSL data signal.

The ADSL office equipment 104 includes a Digital Subscriber Line Multiplexer (DSLAM). The equipment 104 is coupled via the DSLAM and a provider with the Internet. The multiplexer converts data transmitted in the form of analog signals into digital signals to feed the resultant signals to the provider.

The ADSL transmission system converts a digital signal into an analog signal through a modulation and demodulation scheme called a Discrete Multi-Tone (DMT) scheme to achieve high-speed data transmission at a high transmission rate.

In the DMT system, a transmission side conducts Quadrature Amplitude/Phase Modulation (QAM) for 256 carriers and multiplexes the modulated carriers through an inverse Fourier transform to deliver the multiplexed signals to a reception side. When the signals are received, the reception side extracts the carriers from the signals using a Fourier transform to demodulate the extracted carriers.

In an ADSL transmission system, when a line of the ADSL system and a line of an Integrated Service Digital Network (ISDN) are configured in one bundle of cables, the line of the ADSL system is affected by the ISDN line. This possibly leads to a problem of occurrence of noise that lowers the data transmission rate on the line of the ADSL system. Among the influences from the ISDN line onto the line of the ADSL system, crosstalk noise from the ISDN line is most troublesome.

To suppress such influence of the ISDN, it is also possible in the ADSL transmission system to separately accommodate the line of the ADSL system and the ISDN line in different cable bundles. However, in the ADSL transmission system of this configuration, there arises another problem that the load imposed on the operator increases. In this situation, for the ADSL transmission system using a cable bundle including both of the lines of the ISDN and ADSL systems, there has been desired a transmission method to prevent the reduction in the data transmission rate.

Referring now to FIG. 2, description will be given of crosstalk noise taking place on the line of ADSL system when the ISDN line of the TCM scheme is employed. FIG. 2 shows crosstalk noise appearing on an ADSL Transceiver Unit-Remote side (ATU-R), which is a device on a terminal side of the line of ADSL system, due to data transmission through the TCM-ISDN line while reverse or downstream data transmission is taking place. On the TCM-ISDN line, data is alternately transmitted in the upstream and downstream directions every 1.25 milliseconds (ms).

During downstream data transmission on the line of ADSL system, when data is transmitted in the upstream direction on the TCM-ISDN line, a high-power signal before attenuation thereof on the TCM-ISDN line influences an attenuated signal on the line of ADSL system. This disadvantageously causes a Near End Cross Talk (NEXT) in the ATU-R which is the terminal device of the ADSL system.

Also, during a period of downstream data transmission on the line of ADSL system, when data is transmitted in the downstream direction through the TCM-ISDN line, a signal on the TCM-ISDN line affects an attenuated signal on the line of ADSL system. This results in a Far End Cross Talk (FEXT) in the ATU-R which is a terminal of the line of ADSL system. In this regard, a similar phenomenon occurs also in an ADSL Transceiver Unit-Center Side (ATU-C) which is a device on the central office side of the ADSL communication system.

Next, description will be given of a quantity of the crosstalk noise by referring to FIG. 3. FIG. 3 shows quantities of the crosstalk noise. As shown in FIG. 3, a noise quantity at occurrence of "NEXT" is more than a noise quantity at occurrence of "FEXT". This is because a high-power signal not attenuated on the TCM-ISDN line affects a signal attenuated on the line of ADSL system. Paying attention to the difference between the noise quantities, there has been proposed a method in which data is transmitted by changing an amount of transmission data between NEXT and FEXT. In this method called a dual bit map method, at occurrence of FEXT in which the noise quantity is less than a predetermined threshold value, a larger amount of data is transmitted as shown in FIG. 3. At occurrence of NEXT in which the noise quantity is more than a predetermined threshold value, a smaller amount of data is transmitted.

Since the quantity of noise periodically changes in an ADSL transmission system in which a TCM-ISDN line is adjacent to a line of ADSL system, it is a common practice that a Signal To Noise Ratio (SNR) is measured for carriers of the upstream and downstream directions to obtain a bit distribution ratio according to the measured SNR values.

Referring next to FIG. 4, description will be given of a conventional ADSL transmission system.

Configuration on ATU-C 300 Side

Description will be given of a system configuration on the ATU-C 300 side.

The ATU-C 300 side includes in its transmission section a Cyclic Redundancy Check (CRC) error processing unit 315 to add a CRC code to data sent from an upper-level system, a scramble processing and error correction (scram & Forward Error Correction (FEC)) unit 301 which executes scramble processing for the data including the CRC code and which adds an error correction code of the Reed-Solomon system to the resultant data, a mapping unit 302 which changes a transmission power distribution ratio and a bit distribution ratio of each carrier according to timing at which a noise level alters to thereby add the bit distribution ratio and the transmission power distribution ratio to the carrier, an inverse Fourier transform unit 303 which modulates and multiplexes a multivalue Quadrature Amplitude Modulation (QAM) signal produced from the mapping unit 302, and a digital-analog converter unit 304 to convert an output signal from the inverse Fourier transform unit 303 into an analog signal to transmit the signal as a downstream analog signal to the reception side.

The ATU-C 300 includes in a reception section an analog-digital converter unit 305 to convert an analog signal sent from the ATU-R 400 into a digital signal, a Fourier transform unit 306 to conduct a Fourier transform for the digital signal, a demapping unit 307 to change a bit distribution ratio and a transmission power distribution ratio according to timing at which a noise level varies to demodulate the signal transmitted thereto, a scramble processing and error correction (scram & FEC) unit 308 to execute scramble processing for the data and conduct an error correction for the data to thereby restore correct data, and a CRC error detector unit 314 to execute processing by use of a predetermined expression to check the CRC code added to the data and detect a CRC error.

The ATU-C 300 further includes a pseudo-random signal generator unit 310, a noise tone generator unit 311, and a bit-power distribution ratio calculating unit 312. FIG. 5 shows a configuration of the calculating unit 312 in detail.

Configuration on ATU-R 400 Side

Description will next be given of the configuration on the side of the ATU-R.

The ATU-R 400 includes in a transmission section thereof a CRC error processing unit 415 to add a CRC code to data sent from an upper-level system, a scramble processing and error correction (scram & FEC) unit 401 which executes scramble processing for the data including the CRC code and which adds an error correction code of the Reed-Solomon system to the obtained data, a mapping unit 402 to change a transmission power distribution ratio and a bit distribution ratio of each carrier according to timing at which a noise level alters to thereby add the bit distribution ratio and the transmission power distribution ratio to the carrier, an inverse Fourier transform unit 403 which modulates and multiplexes a multivalue QAM signal produced from the mapping unit 402, and a digital-analog converter unit 404 which converts an output signal from the inverse Fourier transform unit 403 into an analog signal to transmit the signal as an upstream analog signal to the transmission side.

The ATU-C 400 includes in a reception section an analog-digital converter unit 408 to convert an analog signal sent from the ATU-C 300 into a digital signal, a Fourier transform unit 407 to conduct a Fourier transform for the digital signal, a demapping unit 406 to change a bit distribution ratio and a transmission power distribution ratio according to timing at which a noise level varies to demodulate the signal transmitted thereto, a scramble processing and error correction (scram & FEC) unit 405 which executes scramble processing for the data and conduct an error correction for the data to thereby restore correct data, and a CRC error detector unit 414 which executes processing by use of a predetermined expression to check the CRC code added to the data and detect a CRC error.

The ATU-R 400 additionally includes a pseudo-random signal generator unit 409 and a bit-power distribution ratio calculating unit 410. FIG. 6 shows a configuration of the calculating unit 410 in detail.

In the ADSL transmission system of FIG. 4, during data transmission in the ISDN downstream direction, NEXT occurs in the ATC-C 300 and FEXT takes place in the ATC-R 400. During data transmission in the ISDN upstream direction, FEXT occurs in the ATC-C 300 and NEXT takes place in the ATC-R 400.

To secure a required data transmission capacity under a noisy environment, the pseudo-random signal generator (310, 409) generates pseudo-random signals by sequentially assigning data in the form of a predetermined pseudo-random sequence to each carrier used for data transmission. The resultant pseudo-random signal is fed to the inverse Fourier transform unit (303, 403) to be delivered via the digital-analog converter (304, 404) to the communicating station side.

The bit-power distribution ratio calculation unit (312, 410) obtains, by use of the pseudo-random signal created by the pseudo-random signal generator (409, 310) on the communicating station side, a bit distribution ratio and a transmission power distribution ratio which are assigned to each carrier for data transmission under NEXT and FEXT. The calculation unit (312, 410) then stores the bit distribution ratio and the transmission power distribution ratio attained under both NEXT and FEXT in the demapping unit (307, 406) on the own station side and the mapping unit (302, 402) on the communicating station side.

Description will now be given of operation of the bit-power distribution ratio calculation unit (312, 410) to obtain a bit distribution ratio and a transmission power distribution ratio. Since the ATU-C 300 and the ATU-R 400 conduct substantially the same operation, description will be given of only the processing to attain a bit distribution ratio and a transmission power distribution ratio in the downstream direction.

During a training period to calculate a bit distribution ratio and a transmission power distribution ratio which are assigned to each carrier, the pseudo-random signal generator 310 modulates amplitude of each carrier used for data transmission into amplitude associated with a string of bits of predetermined data assigned in association with a predetermined pseudo-random sequence. The signal generator 310 delivers the modulated amplitude of each carrier to the inverse Fourier transform unit 303.

The Fourier transform unit 303 conducts the Fourier transform for each carrier having the modulated amplitude to produce a voltage value in a digital format by amalgamating the carriers. The digital-analog converter 304 converts a digital voltage value into an analog signal having an actual voltage value to send the signal to a line.

The ATU-R 400 converts by the analog-digital converter 408 the analog signal from the ATU-C 300 into a digital voltage value. The Fourier transform unit 407 conducts the Fourier transform for the digital voltage value to obtain each carrier with modulated amplitude and delivers the carrier to the bit-power distribution ratio calculation unit 410.

The calculation unit 410 calculates, by a downstream SNR evaluation unit, SNR values of each carrier under NEXT and FEXT to obtain a mean SNR value of each carrier.

In FIG. 7, "A" indicates an SNR mean value for occurrence of FEXT and an SNR mean value for occurrence of NEXT evaluated by the downstream SNR evaluation unit.

The downstream SNR evaluation unit shown in FIG. 6 keeps in "NEXT SNR" the SNR mean value under NEXT and in "FEXT SNR" the SNR mean value under FEXT.

The bit-power distribution ratio calculation unit 410 calculates a bit distribution ratio and a transmission power distribution ratio of each carrier for each noise level according to the measured SNR mean value of each carrier and feeds the distribution ratios to the demapping unit 406 to store the ratios therein and then delivers the ratios to the mapping unit 402. In FIG. 7, "B" conceptually indicates operation to determine the bit distribution ratio of each carrier according to the SNR mean value evaluated by the downstream SNR evaluation unit.

During the training period to calculate a bit distribution ratio to be assigned to a carrier for data transmission and a transmission power distribution ratio to be used for the carrier, the mapping module 402 assigns to a predetermined carrier a predetermined number of bits of the information of the bit distribution ratio and the transmission power distribution ratio calculated by the calculation module 410 to deliver the resultant carrier to the inverse Fourier transform module 403.

The inverse Fourier transform module 403 conducts the inverse Fourier transform for the predetermined carrier from the mapping module 402 to produce a voltage value represented in a digital format. The digital-analog converter 404 converts the digital voltage value into an analog signal of the voltage value to feed the signal to the line.

The ATU-C 300 converts by the analog-digital converter 305 the analog signal from the ATU-R 400 into a voltage value expressed in a digital format. The Fourier transform module 306 conducts the Fourier transform for the digital voltage value to attain each carrier with modulated amplitude.

The demapping module 307 acquires information of the bit and transmission power distribution ratios from the predetermined carriers assigned with predetermined numbers of bits and sends the information to the mapping module 302 to store the information therein.

The mapping module (302, 402) selects, form the two kinds of ratios, i.e., the bit and transmission power distribution ratios calculated through the above processing, a bit distribution ratio and a transmission power distribution ratio according to the noise level at data transmission and adds the bit distribution ratio and the transmission power distribution ratio to each carrier. The demapping module (307, 406) obtains, by use of a bit distribution ratio and a transmission power distribution ratio equal to those selected according to the noise level in the communicating station, data assigned to the carrier.

The ADSL transmission system shown in FIG. 4 includes a noise sync tone generator 311 on the ATU-C 300 side and a clock detector 411 and a bit-power distribution ratio selector 412 on the ATU-R 400 side.

It is assumed that the clock signal on the ATU-C 300 side is synchronized with timing at which the noise level changes and the noise level change timing is known. When noise is, for example, crosstalk from the TCM-ISDN line, NEXT and FEXT alternately take place every 1.25 ms, and hence the SNR of each carrier also changes every 1.25 ms. Therefore, it is required that the transmission section of the ATU-C 300 receives a clock signal of which amplitude changes every 1.25 ms synchronized with the timing of the noise level change and then delivers the clock to the reception section of the ATU-R 400. For this purpose, the noise sync tone generator 311 produces a noise sync tone signal of which a signal level alters at timing synchronized with the clock signal and feeds the signal to the ATU-R 400. More specifically, according to the clock signal synchronized with timing of the noise level change, the generator 311 alters amplitude of a predetermined carrier in synchronization with the noise level change timing.

The clock detector 411 detects timing of change in the noise level according to the change in the carrier amplitude obtained by the Fourier transform module 407 and sends the noise level change timing to the bit-power distribution ratio selector 412.

The selector 412 recognizes the timing of the noise level change using the notification from the clock detector 411 and designates, by using the bit and transmission power distribution ratios stored in the mapping module 402, a bit distribution ratio and a transmission power distribution ratio that is adopted in data transmission according to the noise level.

Using the bit and transmission power distribution ratios stored in the demapping module 406, the bit-power distribution ratio selector 412 specifies a bit distribution ratio and a transmission power distribution ratio equal respectively to those employed by the ATU-C 300 according to the noise level, the specified bit and transmission power distribution ratios being used for data demodulation.

FIG. 8 shows a configuration of a hyperframe including 345 symbols. In FIG. 8, symbols on the left side of a dotted line A are associated with a little crosstalk noise from the ISDN line (FEXT). For the symbols, a large number of bits can be allocated to the carrier. Symbols interposed between the dotted line A and a dotted line B are associated with much crosstalk noise from the ISDN line (FEXT). For the symbols, only a few bits can be allocated to the carrier.

When data transmission is stated at symbol 0 in synchronization with timing of occurrence of FEXT from the ISDN line, timing to receive symbol 344, i.e. the 345th symbol synchronizes with timing of change in the crosstalk noise from the ISDN line. It is therefore possible to conduct symbol transmission beginning at the 346th symbol at timing synchronized with the timing of occurrence of FEXT from the ISDN line as shown in FIG. 8. The bit-power distribution ratio selector 412 stores, for each sequential symbol transmission, a bit distribution ratio and a transmission power distribution ratio selected from the bit distribution and transmission power distribution ratios.

The inverse Fourier transform module 303 receives signals from the pseudo random signal generator 310, the noise sync tone generator 311, and the mapping module 302. However, these signals are not delivered to the transform module 303 at the same time. That is, the module 303 conducts the inverse Fourier transform for the signals received at mutually different points of time to deliver resultant signals to the digital-analog converter 304. The modules described above are controlled by a sequencer (not shown). Under control of the sequencer, the generators 310 and 311 send signals to the inverse Fourier transform module 303. The module 303 beforehand recognizes the sequence in which the above modules deliver the signals under control of the sequencer.

In association with the crosstalk noise from the TCM-ISDN on the adjacent line, FEXT and NEXT alternately occur every 400 hertz (Hz) and the noise period is synchronized with 400 Hz as shown in FIG. 3. Therefore, in the conventional ADSL transmission system, the period of crosstalk noise from the TCM-ISDN is predicted using a 400 Hz clock signal to thereby prevent errors due to periodically occurring noise.

However, there exists a problem that noise like "burst" takes place for a short period of time during communication to resultantly cause disconnection of the line connection. In the ADSL transmission system of the prior art, when such burst-like noise takes place for a short period of time during communication, it is not possible to predict a Power Spectrum Density (PSD) and a period of the noise. The PSD cannot be fully measured during the ordinary initialization and training phase and hence the bit distribution ratios used for the data transmission are not appropriate. Therefore, at occurrence of non-periodic noise, the multicarrier transmission cannot be efficiently conducted.

In a technical article published preceding the present invention, for example, Japanese Patent Reference No. 3348719, there is described a technique in which a transmission power distribution ratio of each carrier of the multicarrier is calculated according to a period of periodically changing noise. According to the distribution ratio, data is transmitted such that the multicarrier transmission is efficiently accomplished under periodically changing noise.

Another article, for example, Japanese Patent Reference No. 3319422 described a technique in which data transmission is achieved utilizing a multicarrier between first and second communication stations in a noisy environment where timing of the noise level change is known.

In accordance with the technique described in Japanese Patent Reference No. 3348719, the multicarrier transmission is efficiently carried out under the periodically changing noise. The technique of Japanese Patent Reference No. 3319422 is multicarrier transmission in a noisy environment where the noise level change timing is known. In the techniques of these articles, consideration has not been given to countermeasures to deal with a situation at which non-periodic noise occurs.

SUMMARY OF THE INVENTION

It is therefore an object of the present invention, which has been devised in consideration of the problem above, to provide a multicarrier transmission apparatus and a multicarrier transmission method capable of efficiently conducting multicarrier transmission even when non-periodic noise takes place.

To achieve the object, the present invention has aspects as below.

In accordance with the present invention, there is provided a multicarrier transmission apparatus for conducting data transmission using a bit distribution ratio, including an SNR measuring unit for measuring a Signal to Noise Ratio (SNR) of periodic noise on a communication line, a bit distribution ratio calculating unit for calculating a bit distribution ratio to be assigned to each carrier for data transmission according to a measurement result of the SNR measured by the SNR measuring unit, a minimum bit distribution ratio calculating unit for comparing a plurality of bit distribution ratios calculated by the bit distribution ratio calculating unit with each other to thereby detect a minimum bit value for each carrier, and calculating, on the basis of the minimum bit value of each carrier detected by the minimum bit distribution ratio calculating unit, a minimum bit distribution ratio including minimum bit values of all carriers; and a transmitting unit for conducting data transmission using the minimum bit distribution ratio calculated by the minimum bit distribution ratio calculating unit.

In accordance with the present invention, there is provided a multicarrier transmission apparatus for conducting data transmission using a bit distribution ratio, including an SNR measuring unit for measuring a Signal to Noise Ratio (SNR) of periodic noise on a communication line, a measurement result calculating unit for comparing a plurality of measurement results of the SNR measured by the SNR measuring unit with each other to thereby detect a minimum SNR value of each frequency and calculating, on the basis of the minimum SNR value of each frequency detected by the measurement result calculating unit, a minimum measurement result including minimum SNR values of all subject frequencies; a minimum bit distribution ratio calculating unit for calculating, on the basis of the minimum measurement result calculated by the measurement result calculating unit, a minimum bit distribution ratio to be assigned to each carrier for data transmission; and a transmitting unit for conducting data transmission using the minimum bit distribution ratio calculated by the minimum bit distribution ratio calculating unit.

In the multicarrier transmission apparatus, the SNR measuring unit measures the SNR every predetermined period of time using a transmission signal.

The multicarrier transmission apparatus further include an SNR detecting unit for detecting, from the measurement results of the SNR measured by the SNR measuring unit, measurement results of the SNR including a frequency zone of SNR value equal to or less than a predetermined SNR reference value. The bit distribution ratio calculating unit calculates a bit distribution ratio to be assigned to each carrier for data transmission according to the measurement results of the SNR detected by the SNR detecting unit.

The multicarrier transmission apparatus further includes an SNR detecting unit for detecting, from the measurement results of the SNR measured by the SNR measuring unit, measurement results of the SNR including a frequency zone of SNR value equal to or less than a predetermined SNR reference value. The measurement result calculating unit compares a plurality of measurement results of the SNR detected by the SNR detecting unit with each other to thereby detect a minimum SNR value of each frequency and calculates, on the basis of the minimum SNR value of each frequency detected by the measurement result calculating unit, a minimum measurement result including minimum SNR values of all subject frequencies.

The multicarrier transmission apparatus further includes a storage unit for storing the measurement results of the SNR detected by the SNR detecting unit. The bit distribution ratio calculating unit calculates a bit distribution ratio to be assigned to each carrier for data transmission according to the measurement results of the SNR stored in the storage unit.

The multicarrier transmission apparatus further includes a storage unit for storing the measurement results of the SNR detected by the SNR detecting unit. The measurement result calculating unit compares a plurality of measurement results of the SNR stored in the storage unit with each other to thereby detect a minimum SNR value of each frequency and calculates, on the basis of the minimum SNR value of each carrier detected by the measurement result calculating unit, a minimum measurement result including the minimum SNR values of all subject frequencies.

In the multicarrier transmission apparatus, the minimum bit distribution ratio calculating unit includes a correcting unit for adding, when it is determined that difference between the minimum bit value detected for each carrier and a mean value of a plurality of bit values in the carrier is equal to or more than a predetermined value, a predetermined value to the minimum bit value of each carrier to thereby correct the minimum bit, value.

In the multicarrier transmission apparatus, the measurement result calculating unit includes a correcting unit for adding, when it is determined that difference between the minimum SNR value detected for each frequency and a mean value of a plurality of the SNR values in the frequency is equal to or more than a predetermined value, a predetermined SNR value to the minimum SNR value of each frequency to thereby correct the minimum SNR value.

The multicarrier transmission apparatus further includes a minimum bit distribution ratio storage unit for storing the minimum bit distribution ratio calculated by the minimum bit distribution ratio calculating unit. The transmitting unit conducts data transmission using the minimum bit distribution ratio stored in the minimum bit distribution ratio storage unit.

In accordance with the present invention, there is provided a multicarrier transmission method for use with a transmission apparatus for conducting data transmission using a bit distribution ratio, including the steps to be conducted by the transmission apparatus. The steps includes an SNR measuring step of measuring a Signal to Noise Ratio (SNR) of periodic noise on a communication line, a bit distribution ratio calculating step of calculating a bit distribution ratio to be assigned to each carrier for data transmission according to a measurement result of the SNR measured by the SNR measuring step, a minimum bit distribution ratio calculating step of comparing a plurality of bit distribution ratios calculated by the bit distribution ratio calculating step with each other to thereby detect a minimum bit value for each carrier, and calculating, on the basis of the minimum bit value of each carrier detected by the minimum bit distribution ratio calculating step, a minimum bit distribution ratio including minimum bit values of all carriers; and a transmitting step of conducting data transmission using the minimum bit distribution ratio calculated by the minimum bit distribution ratio calculating step.

In accordance with the present invention, there is provided a multicarrier transmission method for use with a transmission apparatus for conducting data transmission using a bit distribution ratio, including the steps to be conducted by the transmission apparatus. The steps includes an SNR measuring step of measuring a Signal to Noise Ratio (SNR) of periodic noise on a communication line, a measurement result calculating step of comparing a plurality of measurement results of the SNR measured by the SNR measuring step with each other to thereby detect a minimum SNR value of each frequency and calculating, on the basis of the minimum SNR value of each carrier detected by the measurement result calculating step, a minimum measurement result including minimum SNR values of all subject frequencies; a minimum bit distribution ratio calculating step of calculating, on the basis of the minimum measurement result calculated by the measurement result calculating step, a minimum bit distribution ratio to be assigned to each carrier for data transmission; and a transmitting step for conducting data transmission using the minimum bit distribution ratio calculated by the minimum bit distribution ratio calculating step.

In the multicarrier transmission method, the SNR measuring step measures the SNR every predetermined period of time using a transmission signal.

The multicarrier transmission method further includes an SNR detecting step of detecting by the transmission apparatus, from the measurement results of the SNR measured by the SNR measuring step, measurement results of the SNR including a frequency zone of SNR value equal to or less than a predetermined SNR reference value. The bit distribution ratio calculating step calculates a bit distribution ratio to be assigned to each carrier for data transmission according to the measurement results of the SNR detected by the SNR detecting step.

The multicarrier transmission method further includes an SNR detecting step for detecting by the transmission apparatus, from the measurement results of the SNR measured by the SNR measuring step, measurement results of the SNR including a frequency zone of SNR value equal to or less than a predetermined SNR reference value. The measurement result calculating step compares a plurality of measurement results of the SNR detected by the SNR detecting step with each other to thereby detect a minimum SNR value of each frequency and calculates, on the basis of the minimum SNR value of each frequency detected by the measurement result calculating step, a minimum measurement result including the minimum SNR values of all subject frequencies.

The multicarrier transmission method further includes a storing step for storing in storage of the transmission apparatus by the transmission apparatus the measurement results of the SNR detected by the SNR detecting step. The bit distribution ratio calculating step calculates a bit distribution ratio to be assigned to each carrier for data transmission according to the measurement results of the SNR stored in the storage.

The multicarrier transmission method further includes a storing step for storing in a storage of the transmission apparatus by the transmission apparatus the measurement results of the SNR detected by the SNR detecting step. The measurement result calculating step compares the plural measurement results of the SNR stored in the storage with each other to thereby detect a minimum SNR value of each frequency and calculates, on the basis of the minimum SNR value of each frequency detected by the measurement result calculating step, a minimum measurement result including minimum SNR values of all subject frequencies.

In the multicarrier transmission method, the minimum bit distribution ratio calculating step includes a correcting step of adding by the transmission apparatus, when it is determined that difference between the minimum bit value detected for each carrier and a mean value of a plurality of bit values in the carrier is equal to or more than a predetermined value, a predetermined value to the minimum bit value of each carrier to thereby correct the minimum bit value.

In the multicarrier transmission method, the measurement result calculating step includes a correcting step of adding by the transmission apparatus, when it is determined that difference between the minimum SNR value detected for each frequency and a mean value of a plurality of the SNR values in the frequency is equal to or more than a predetermined value, a predetermined SNR value to the minimum SNR value of each frequency to thereby correct the minimum SNR value.

The multicarrier transmission method further includes a minimum bit distribution ratio storing step of storing in a storage of transmission apparatus by the transmission apparatus the minimum bit distribution ratio calculated by the minimum bit distribution ratio calculating step. The transmission apparatus conducts data transmission using the minimum bit distribution ratio stored in the storage.

In accordance with the present invention, even under non-periodic noise, multicarrier transmission can be efficiently conducted. Even when abrupt noise takes place, a large transmission rate and high transmission quality of a communication line can be secured.

BRIEF DESCRIPTION OF THE DRAWINGS

The objects and features of the present invention will become more apparent from the consideration of the following detailed description taken in conjunction with the accompanying drawings in which:

FIG. 8 is a diagram showing a configuration of a hyperframe;

FIG. 25 is graphs to explain operation to calculate an optimal bit map in a fifth embodiment of a multicarrier transmission system;

FIG. 26 is graphs to explain operation to calculate an optimal bit map in a sixth embodiment of a multicarrier transmission system;

FIG. 27 is graphs to explain operation to calculate an optimal bit map in a seventh embodiment of a multicarrier transmission system.

DESCRIPTION OF THE EMBODIMENTS

Figure 1:
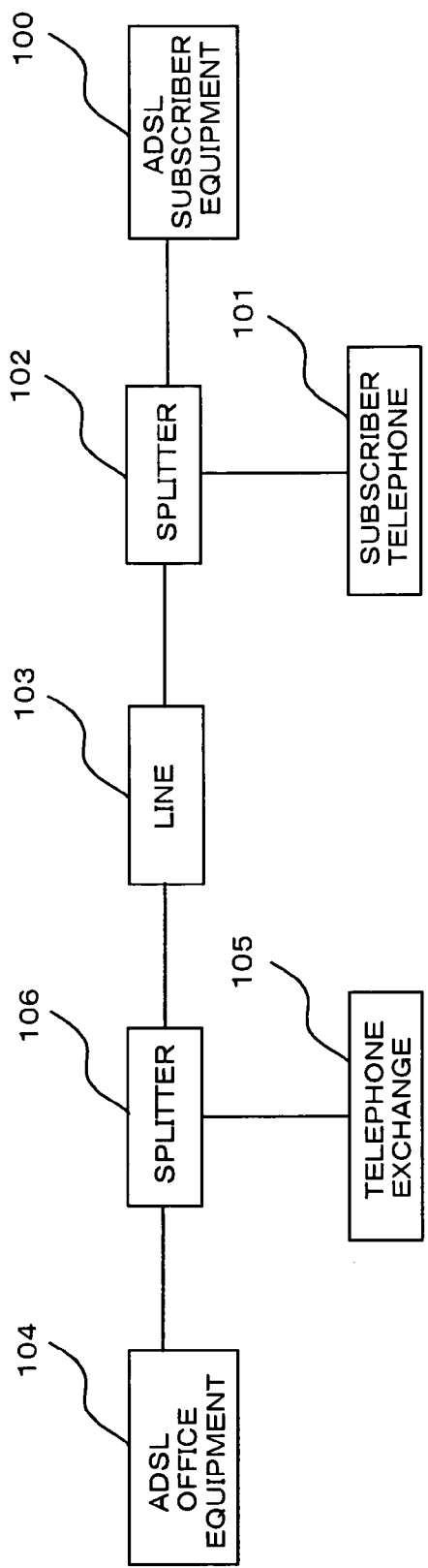
FIG. 1 is a schematic block diagram showing a system configuration of an ADSL transmission system employed to receive ADSL services.
Figure 2:
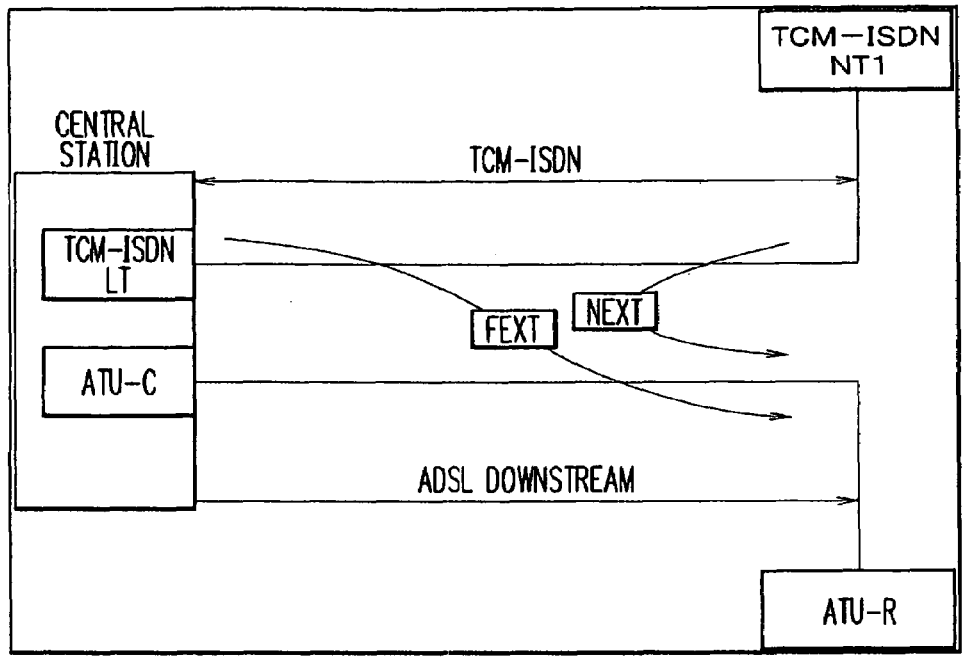
FIG. 2 is a diagram to explain crosstalk noise from an ISDN line.
Figure 3:
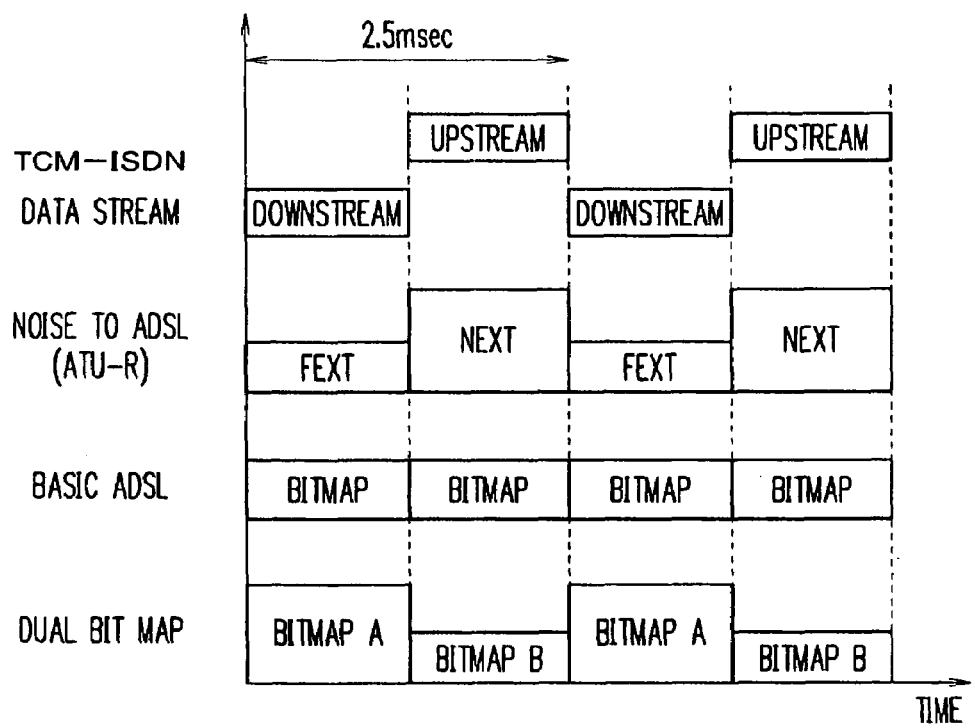
FIG. 3 is a diagram showing quantities of noise for NEXT and FEXT.
Figure 4:
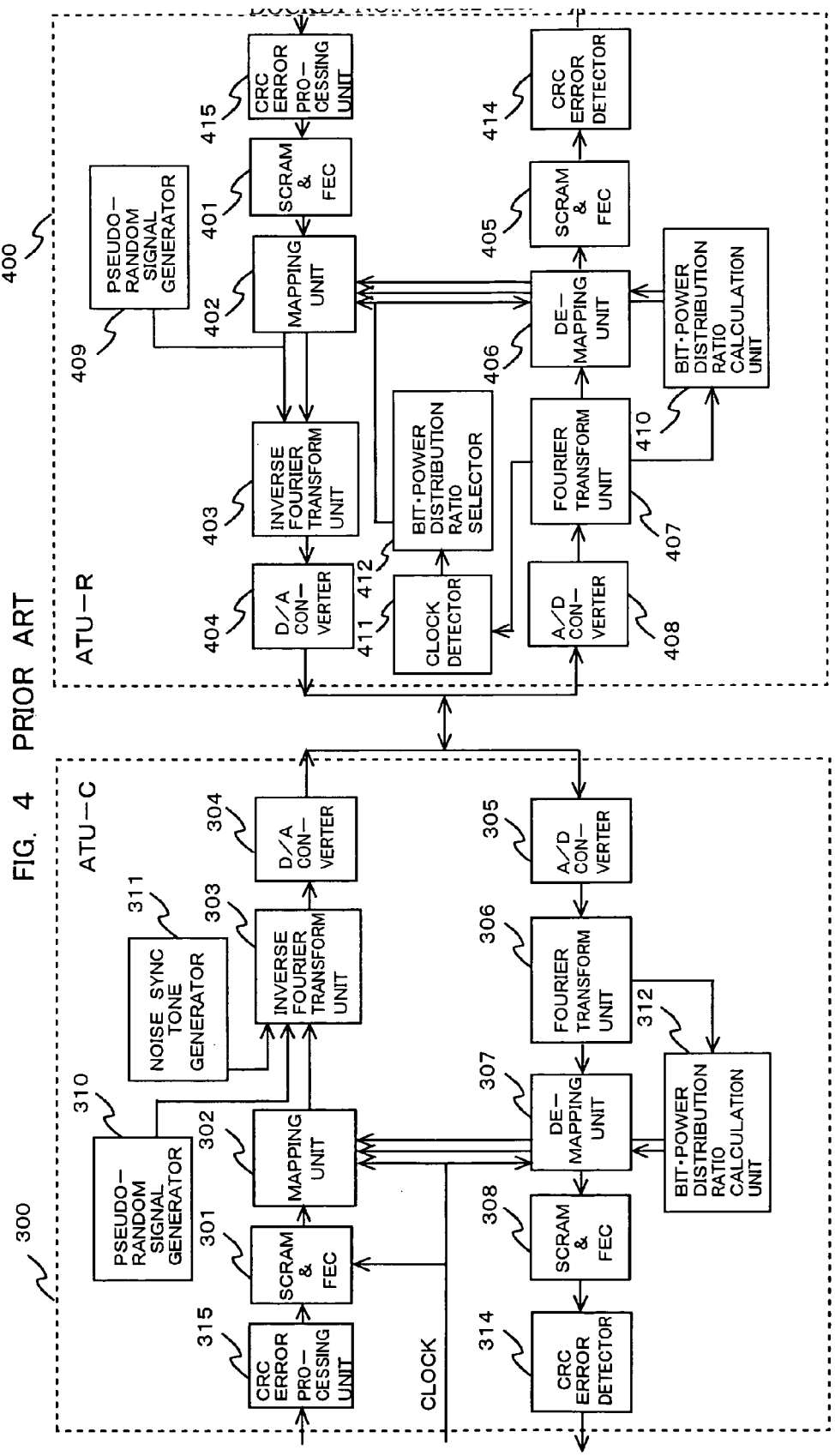
FIG. 4 is a block diagram showing a system configuration of a conventional multicarrier transmission system.
Figure 5:
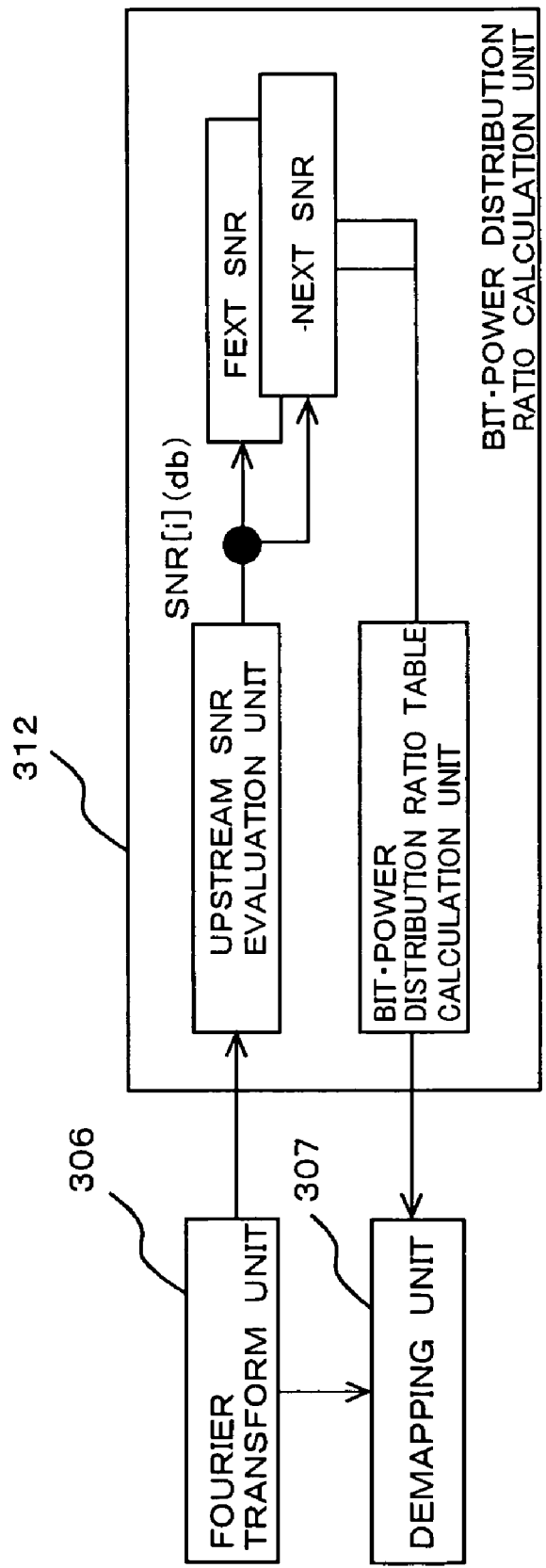
FIG. 5 is a block diagram showing a bit-power distribution ratio calculation module on the ATU-C side shown in FIG. 4.
Figure 6:
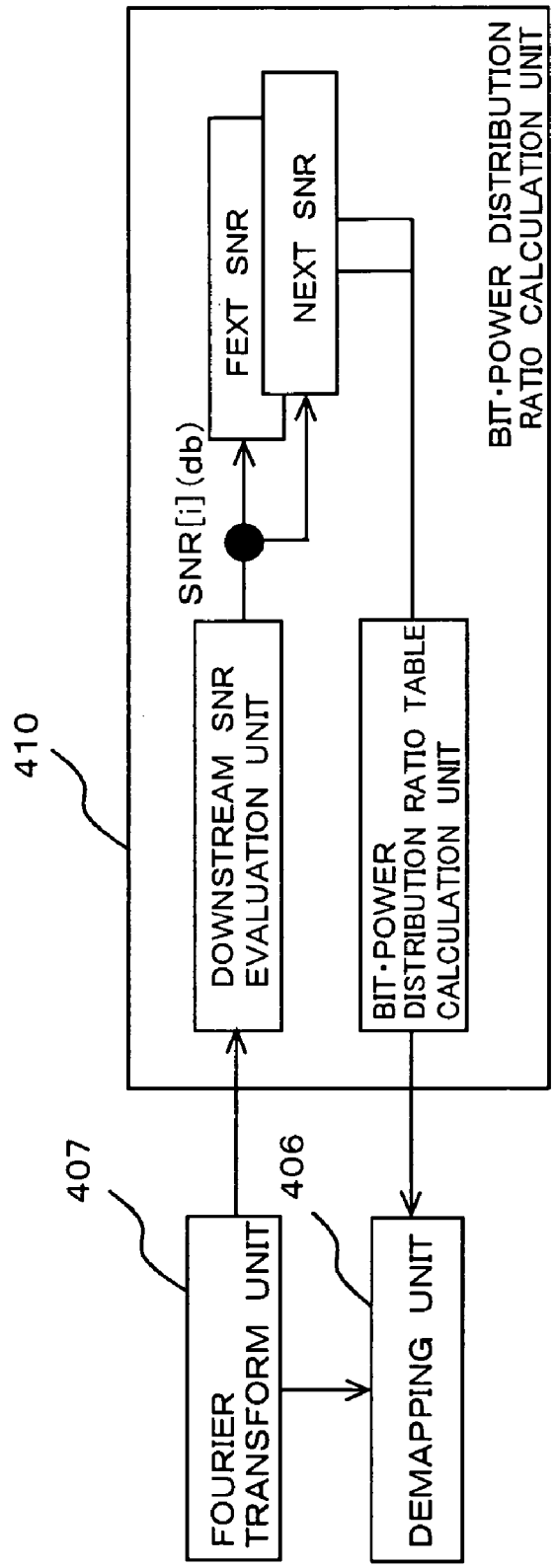
FIG. 6 is a block diagram showing a bit-power distribution ratio calculation module on the ATU-R side shown in FIG. 4.
Figure 7:
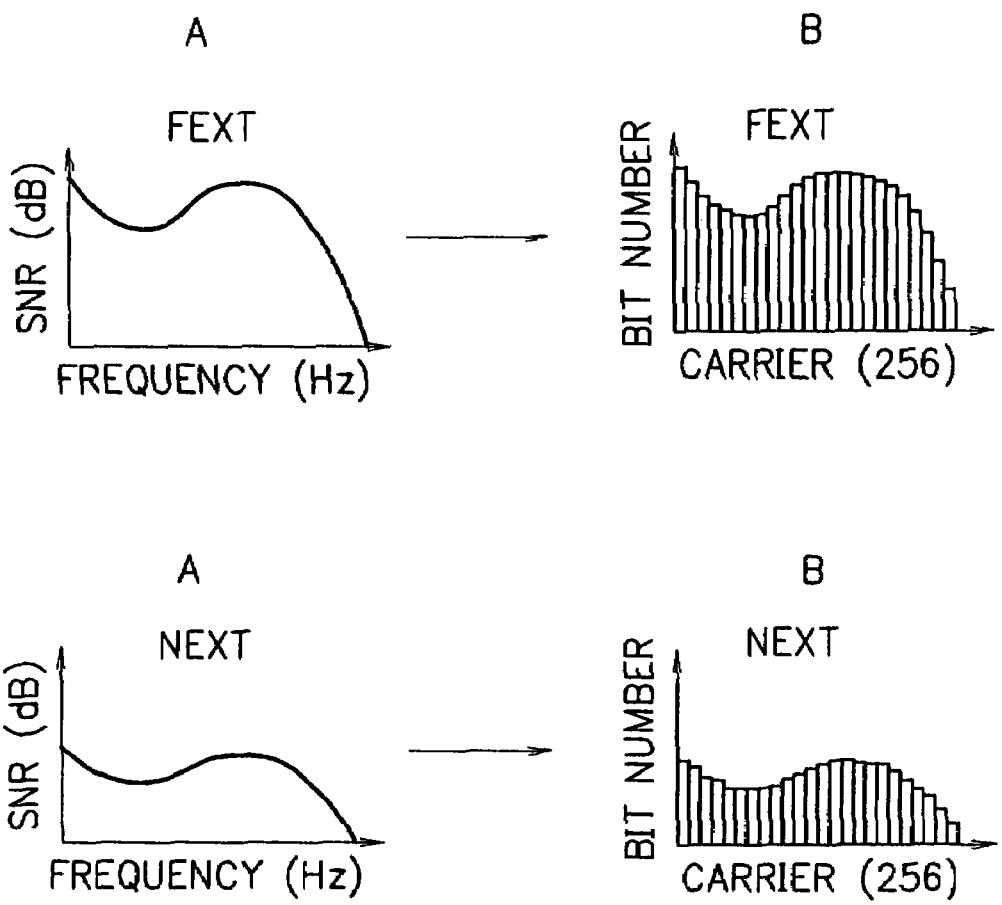
FIG. 7 is graphs schematically showing a method of calculating a bit distribution ratio.
Figure 9:
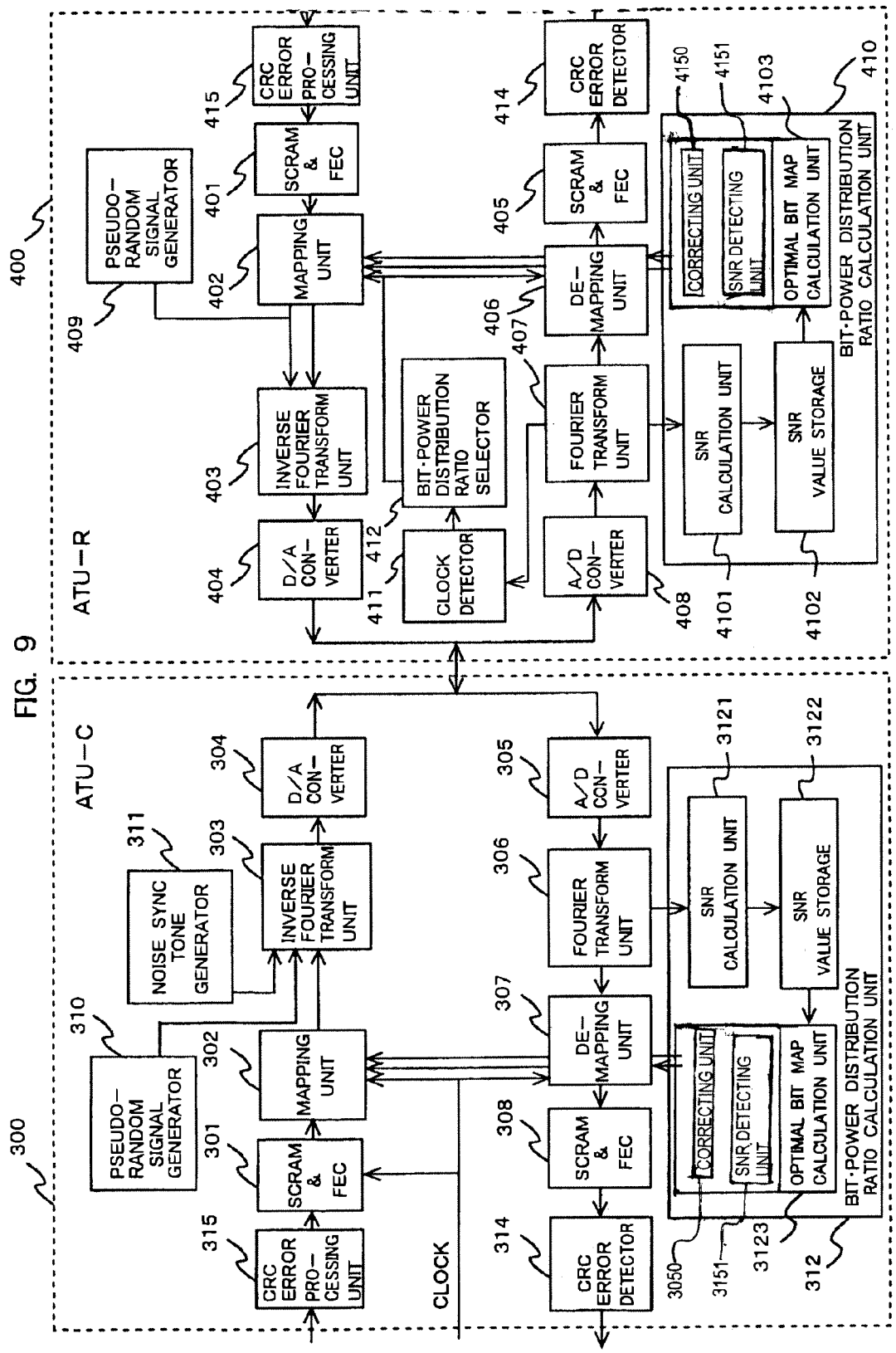
FIG. 9 is a block diagram showing a system configuration of an embodiment of a multicarrier transmission system.

Referring next to FIG. 9, description will be given of aspects of embodiments of a multicarrier transmission system.

In the multicarrier transmission system of the embodiment, the bit-power distribution ratio calculation unit (312, 410) measures plural times an SNR of periodic noise on a communication line. The bit power distribution ratio calculation unit (312, 410) may also be referred to as a measurement result calculating unit (312, 410). The unit (312, 410) compares the measurement results of the SNR with each other to detect minimum SNR values for each frequency. According to the minimum SNR values detected for the respective frequencies, the unit (312, 410) calculates a minimum measurement result including the minimum SNR values for each frequency. On the basis of the minimum measurement result, the bit-power distribution ratio calculation unit (312, 410) calculates a minimum bit distribution ratio to be assigned to each carrier for data transmission and sends the minimum bit distribution ratio to the demapping module (307, 406) and the mapping module (302, 402). The modules (307, 406, 302, 402) conduct data transmission using the minimum bit distribution ratio received from the calculation unit (312, 410).

In the multicarrier transmission system of the embodiment, the bit-power distribution ratio calculation unit (312, 410) measures plural times an SNR of periodic noise on a communication line. The unit (312, 410) compares the measurement results of the SNR with each other to detect minimum SNR values for each frequency. According to the minimum SNR values detected for the respective frequencies, the unit (312, 410) calculates a minimum measurement result including the minimum SNR values for each frequency. On the basis of the minimum measurement result, the bit-power distribution ratio calculation unit (312, 410) calculates a minimum bit distribution ratio to be assigned to each carrier for data transmission and sends the minimum bit distribution ratio to the demapping module (307, 406) and the mapping module (302, 402). The modules (307, 406, 302, 402) conduct data transmission using the minimum bit distribution ratio received from the calculation unit (312, 410).

Due to the operation described above, the multicarrier transmission system of the embodiment can efficiently conduct the multicarrier transmission even when non-periodic noise takes place. Referring next to the accompanying drawings, description will be given of embodiments of the multicarrier transmission system.

First Embodiment

Referring now to FIG. 9, description will be given of a system configuration of a first embodiment of a multicarrier transmission system.

As can be seen from FIG. 9, in the embodiment of a multicarrier transmission system, a bit-power distribution ratio calculation module (312, 410) includes an SNR calculation module (3121, 4101), an SNR value storage (3122, 4102), and an optimal bit map calculation module (3123, 4103).

Figure 10:
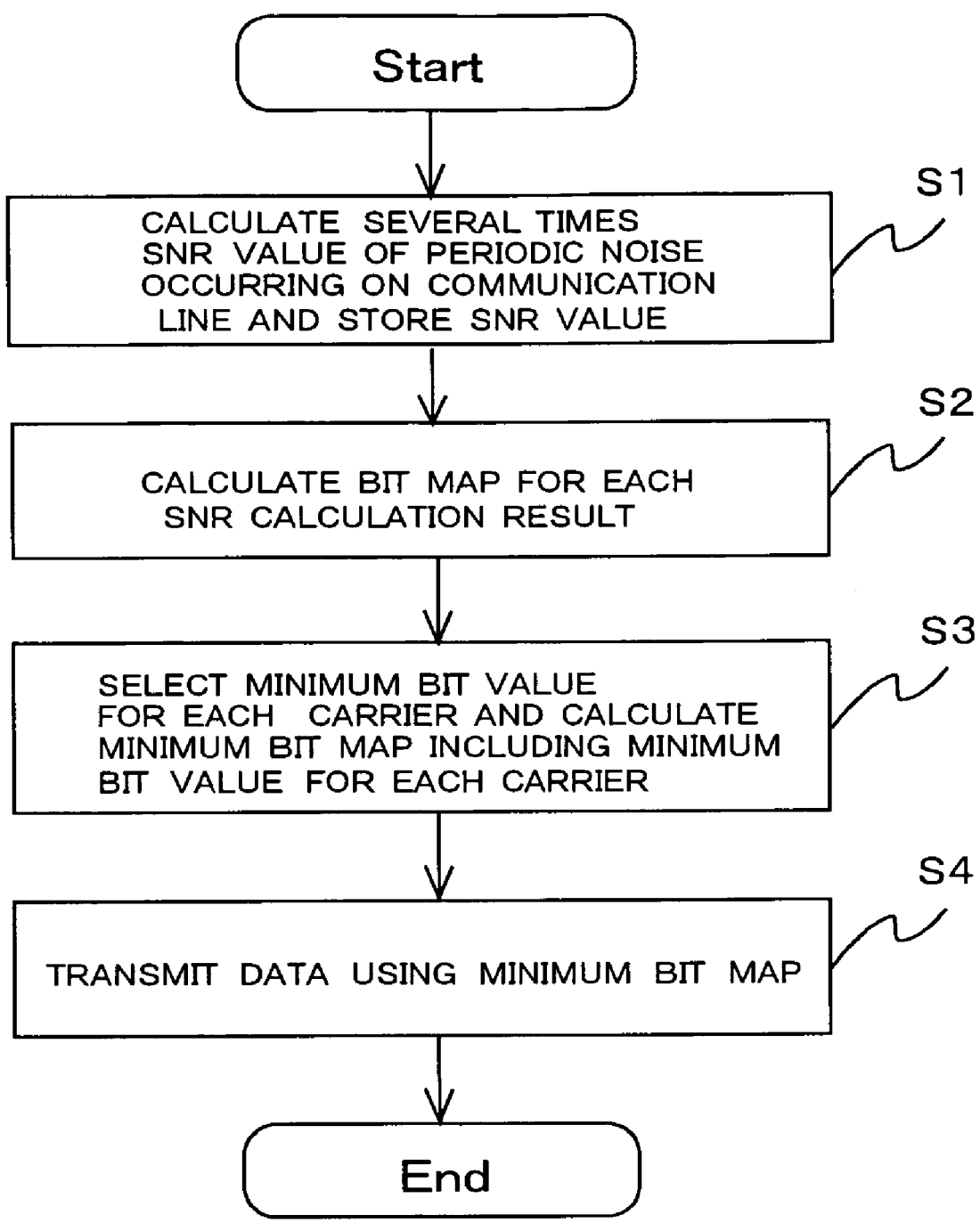
FIG. 10 is a flowchart showing operation to calculate an optimal bit map in a first embodiment of a multicarrier transmission system.

The SNR calculation module (3121, 4101) is a unit to calculate an SNR value of periodic noise. The SNR value storage (3122, 4102) is a unit to store the SNR value obtained by the SNR calculation module (3121, 4101). The optimal bit map calculation module (3123, 4103) calculates an optimal bit distribution ratio to be assigned to each carrier for data transmission according to the calculation results of SNR values stored in the storage (3122, 4102). Description will be given of operation for the SNR calculation module (3121, 4101) of the embodiment to calculate an optimal bit distribution ratio. Since the ATU-C 300 and the ATU-R 400 conduct almost the same processing, description will be given, by referring to FIGS. 9 to 11, only of operation for bit-power distribution ratio calculation module 312 on the ATU-C 300 side to obtain the bit distribution ratio.

The calculation module 312 of the embodiment receives a carrier obtained by the Fourier transform unit 306. The SNR calculation module 3121 calculates an SNR value of each carrier for each noise level using a transmission signal such as a sync symbol and stores the SNR value in the SNR value storage 3122.

The sync symbol is transmitted, for example, every 69 ms. When the sync symbol is adopted, the calculation unit 3121 calculates the SNR value of each carrier for each noise level every 69 ms. The calculation unit 3121 stores the SNR values (A, B, and C of FIG. 11) obtained every 69 ms in the storage 3122 (step S1). The unit 3121 calculates plural times the SNR value of each carrier to store a plurality of calculation results of SNR values shown in FIGS. 12 to 14 in the storage 3122. In the description below, it is assumed that A of FIG. 11 is the calculation result of the SNR value shown in FIG. 12, B of FIG. 11 is the calculation result of the SNR value shown in FIG. 13, and C of FIG. 11 is the calculation result of the SNR value shown in FIG. 14.

Figure 11:
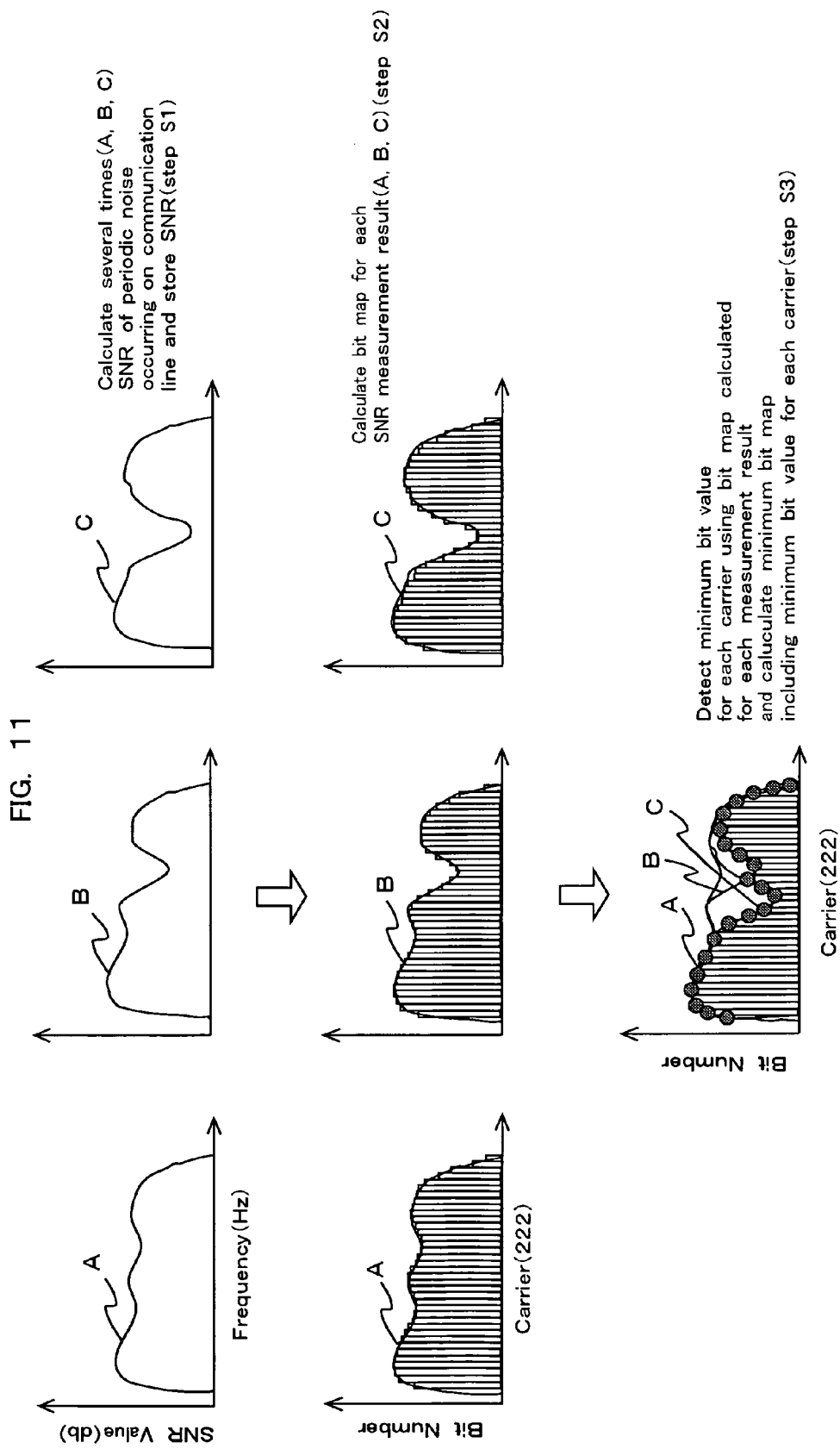
FIG. 11 is graphs to explain operation to calculate an optimal bit map in the first embodiment of a multicarrier transmission system.

On the basis of the SNR value calculation results of A, B, and C of FIG. 11 stored in the SNR value storage 3122, the optimal bit map calculation unit 3123 calculates a bit distribution ratio to be assigned to each carrier for data transmission for each calculation result of the SNR values of A, B, and C shown in FIG. 11 to obtain bit maps of A, B, and C of FIG. 11 (step S2). As a result, the calculation unit 3123 calculates bit maps shown in FIGS. 15 to 17. FIG. 15 shows a bit map calculated according to the calculation result of the SNR value of FIG. 12. FIG. 16 shows a bit map calculated on the basis of the calculation result of the SNR value of FIG. 13. FIG. 17 shows a bit map calculated by using the calculation result of the SNR value of FIG. 14.

The optimal bit map calculation module 3123 compares the calculation results of the bit maps of A, B, and C obtained in step S2 with each other to select a minimum bit value for each carrier. According to the minimum bit value of each carrier, the calculation module 3123 calculates a minimum bit map including the minimum bit value of each carrier of A, B, and C (step S3). Resultantly, the calculation module 3123 calculates a minimum bit map of FIG. 18 including the minimum bit values of the respective carriers thus calculated plural times as shown in FIGS. 15 to 17. It is hence possible to obtain a bit map which secures an optimal transmission rate and which prevents occurrence of "error link down" even when burst noise takes place.

Figure 18:
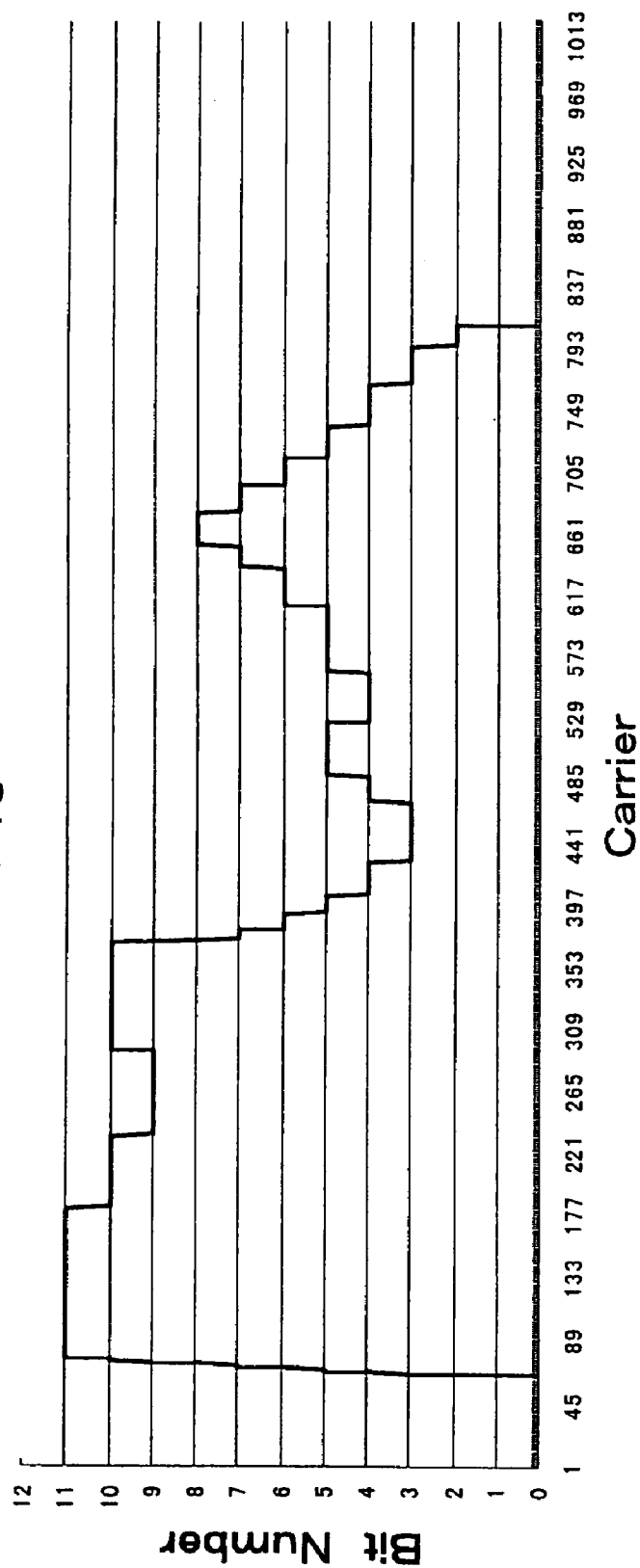
FIG. 18 is a graph showing optimal bit map data for data transmission calculated by the optimal bit map calculation unit shown in FIG. 9.

The optimal bit map calculation module 3123 then sends the bit map calculation result of FIG. 18 to the demapping module 307 and the mapping module 302. The modules 302 and 307 transmit data by use of the calculation result from the calculation module 3123 (step S4).

Through the operation, the multicarrier transmission system of the embodiment accomplishes data transmission using the bit map calculation result shown in FIG. 18. It is hence possible to secure a high transmission rate under noisy environment including burst noise. Also, transmission quality of the communication line can be guaranteed. To change the bit map, it is required to send the bit map to the communicating partner, i.e., the ATU-R 400. Therefore, in the multicarrier transmission system of the embodiment, the bit map is transmitted from the ATU-C 300 to the ATU-R 400 at desired timing as in the prior art. The bit map is similarly sent from the ATU-R 400 to the ATU-C 300. By changing the bit map on both sides in this way, the data transmission is continuously carried out.

As above, the multicarrier transmission system of the embodiment periodically measures the SNR value for noise which occurs in a burst-like fashion and which disappears in a short period of time. On the basis of the SNR value measurement result, the system calculates an optimal bit map value which secures an optimal transmission rate in a burst noise environment and which prevents an event of "error link down" due to burst noise. By transmitting data using the optimal bit map value, the multicarrier transmission can be efficiently conducted even when burst-like noise takes place.

Second Embodiment

Description will be given of a second embodiment.

Figure 12:
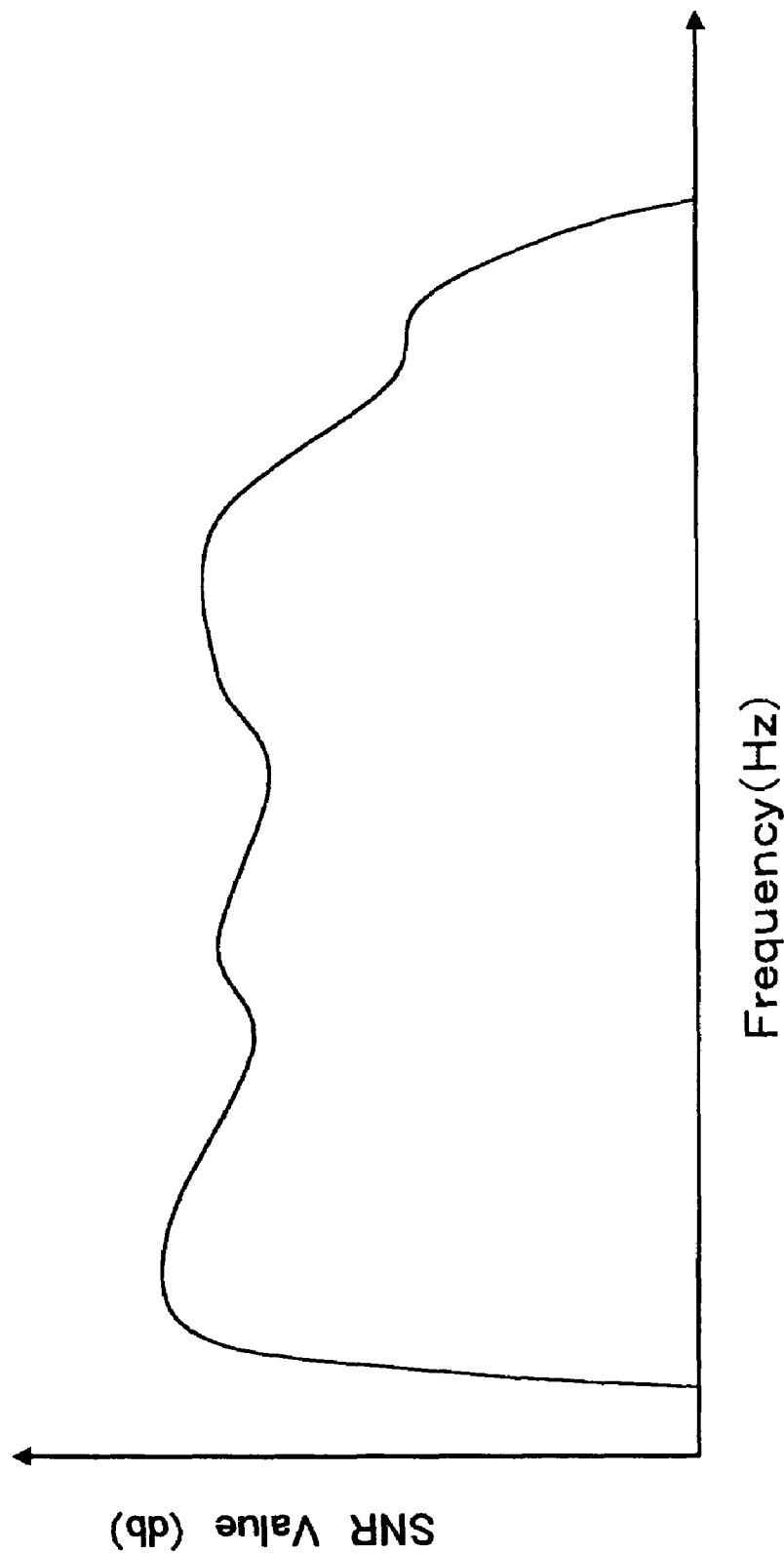
FIG. 12 is a graph showing an SNR value calculated by an SNR calculation unit shown in FIG. 9, namely, a measured result of a state of noise at occurrence of ordinary noise.
Figure 13:
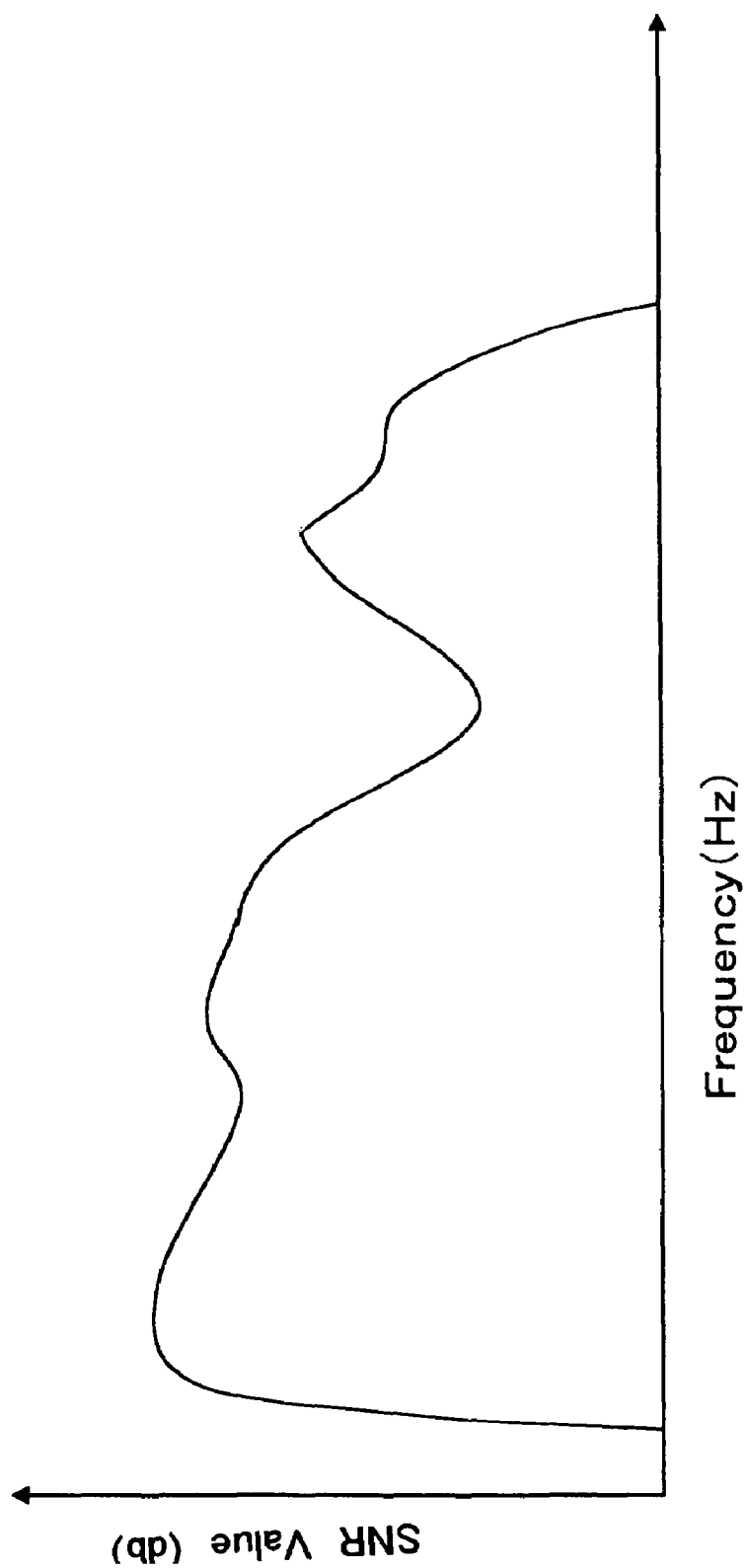
FIG. 13 is a graph showing an SNR value calculated by an SNR calculation unit shown in FIG. 9, namely, a measured result of a first state of noise at occurrence of burst-like noise.
Figure 14:
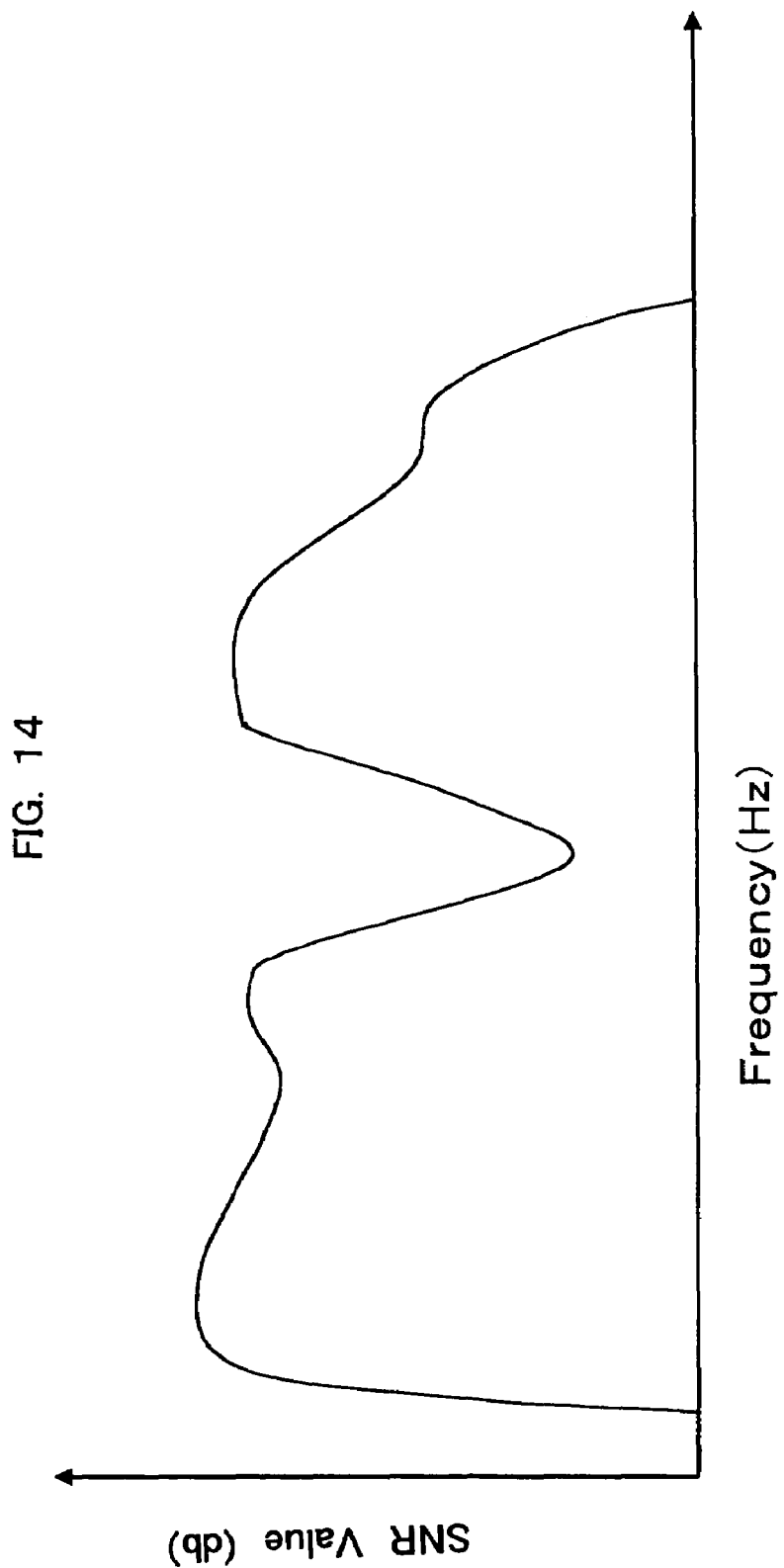
FIG. 14 is a graph showing an SNR value calculated by an SNR calculation unit shown in FIG. 9, namely, a measured result of a second state of noise at occurrence of burst-like noise.
Figure 15:
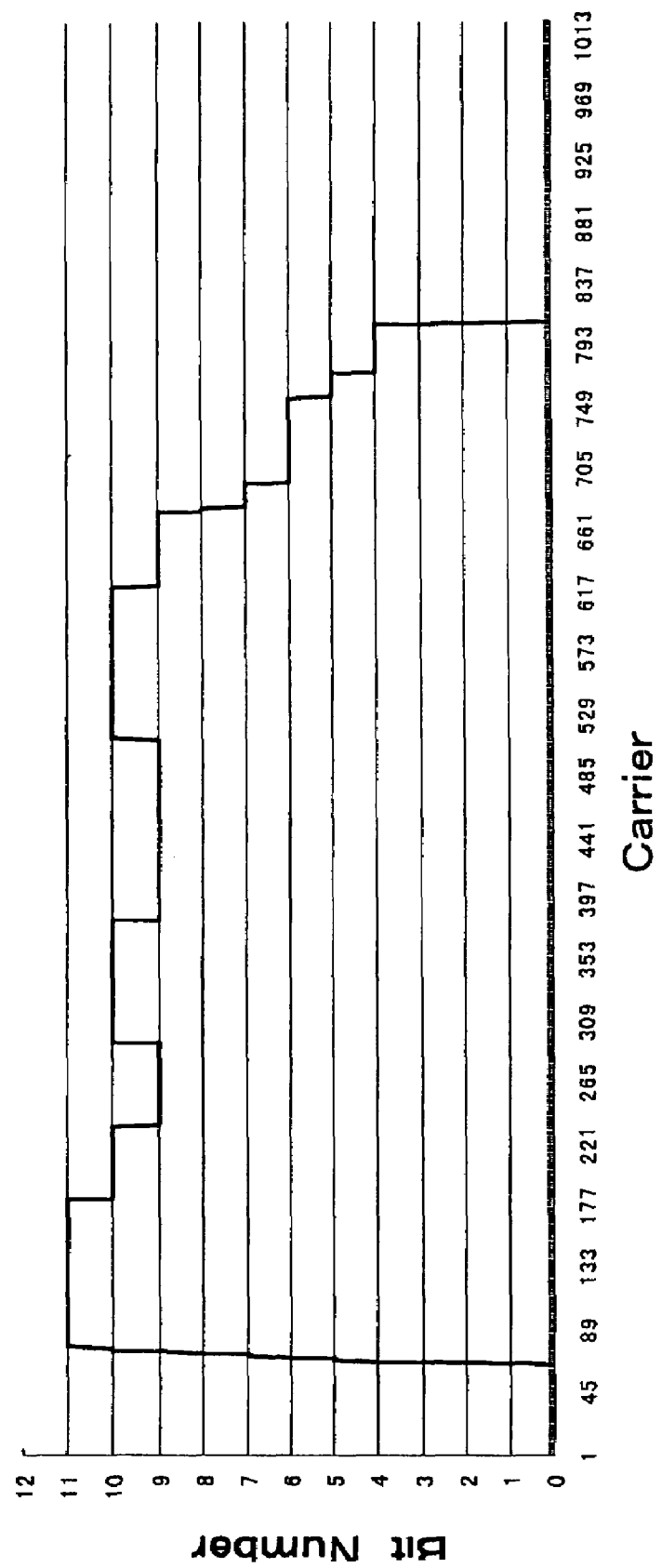
FIG. 15 is a graph showing bit map data calculated by an optimal bit map calculation unit shown in FIG. 9, namely, bit map values calculated according to SNR values in the ordinary state of noise shown in FIG. 12.
Figure 16:
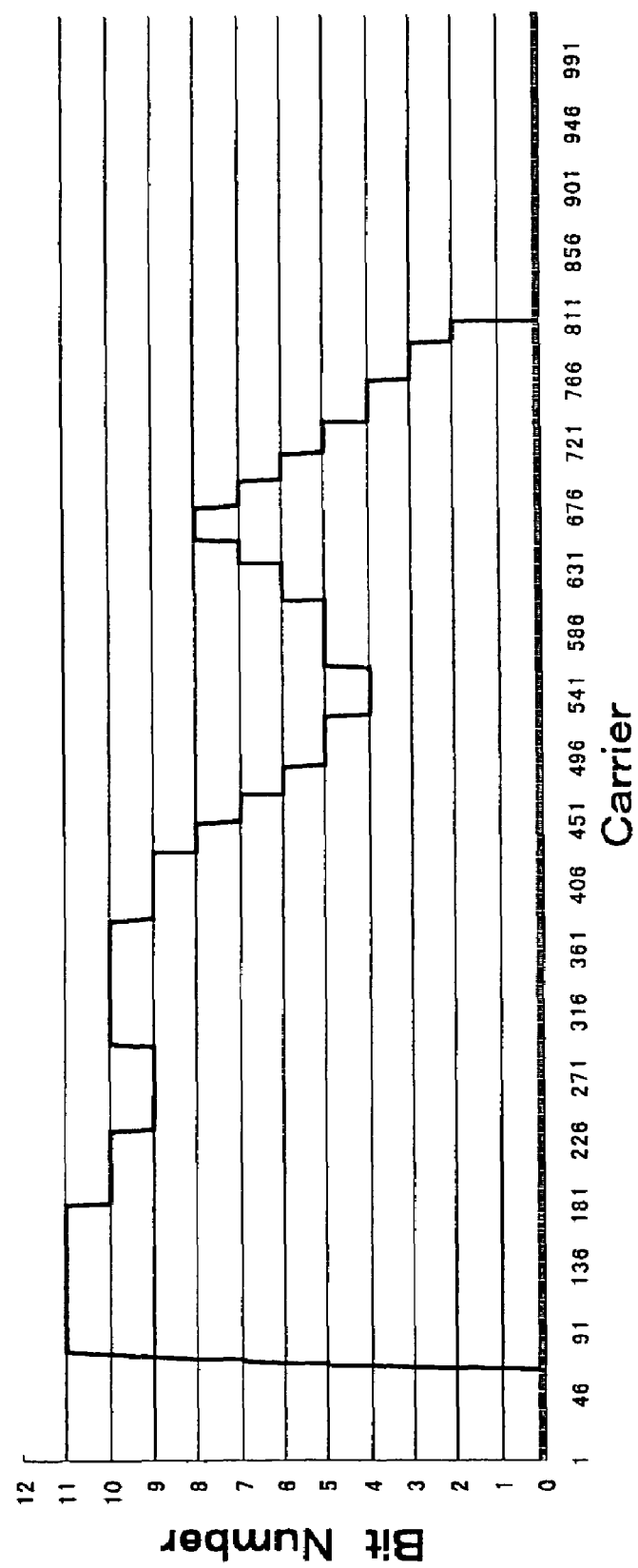
FIG. 16 is a graph showing bit map data calculated by an optimal bit map calculation unit shown in FIG. 9, namely, bit map values calculated according to SNR values in a first state of burst-like noise shown in FIG. 13.
Figure 17:
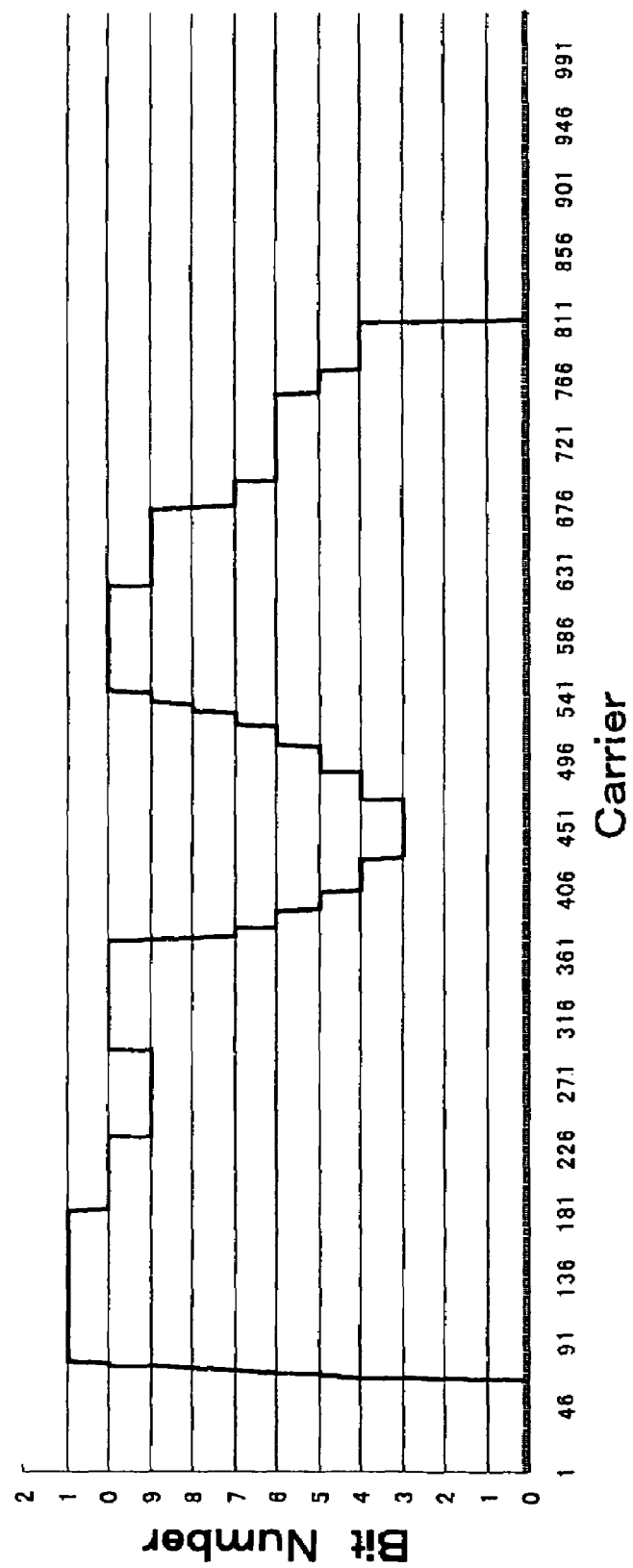
FIG. 17 is a graph showing bit map data calculated by an optimal bit map calculation unit shown in FIG. 9, namely, bit map values calculated according to SNR values in a second state of burst-like noise shown in FIG. 13.
Figure 19:
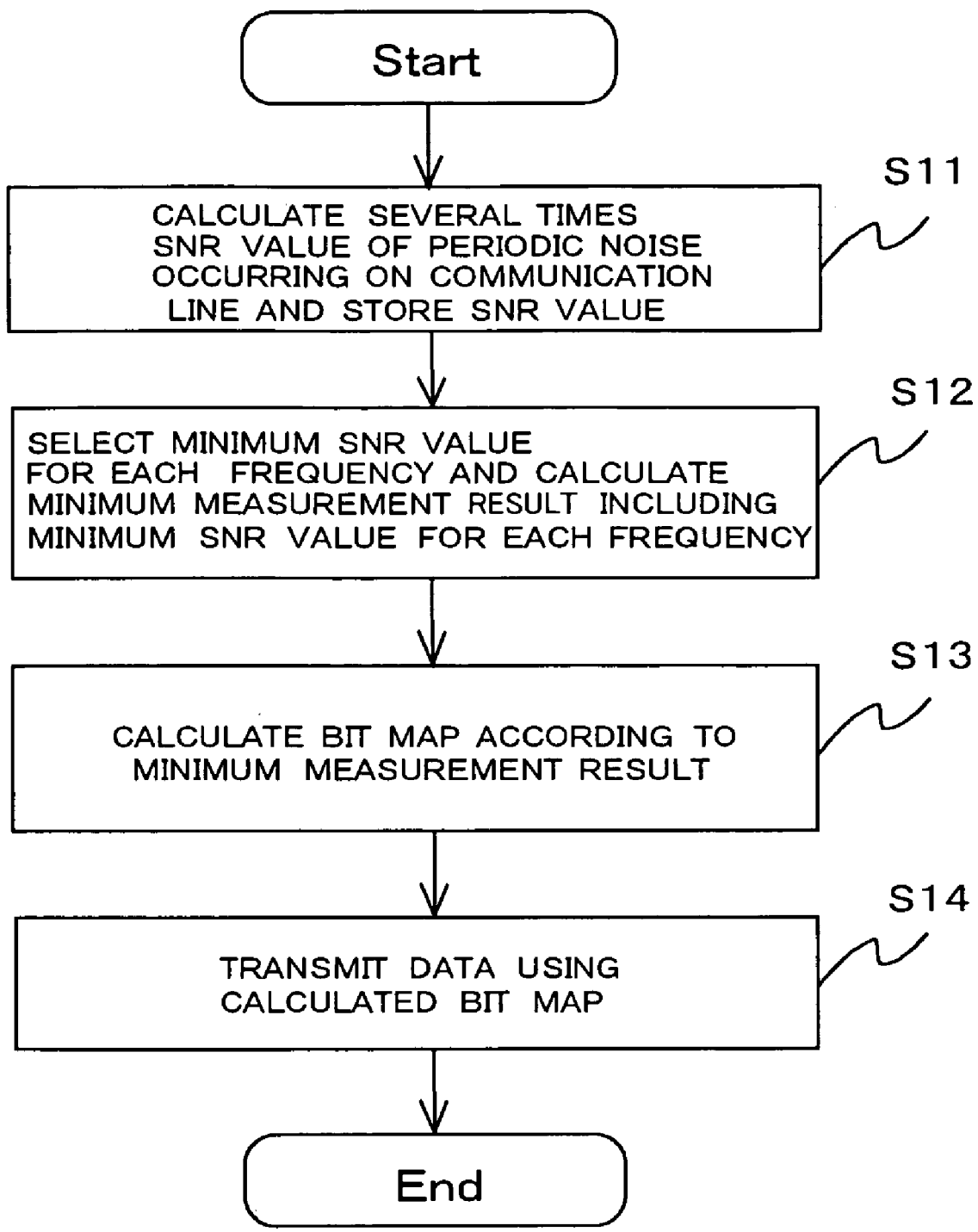
FIG. 19 is a flowchart showing operation to calculate an optimal bit map in a second embodiment of a multicarrier transmission system.
Figure 20:
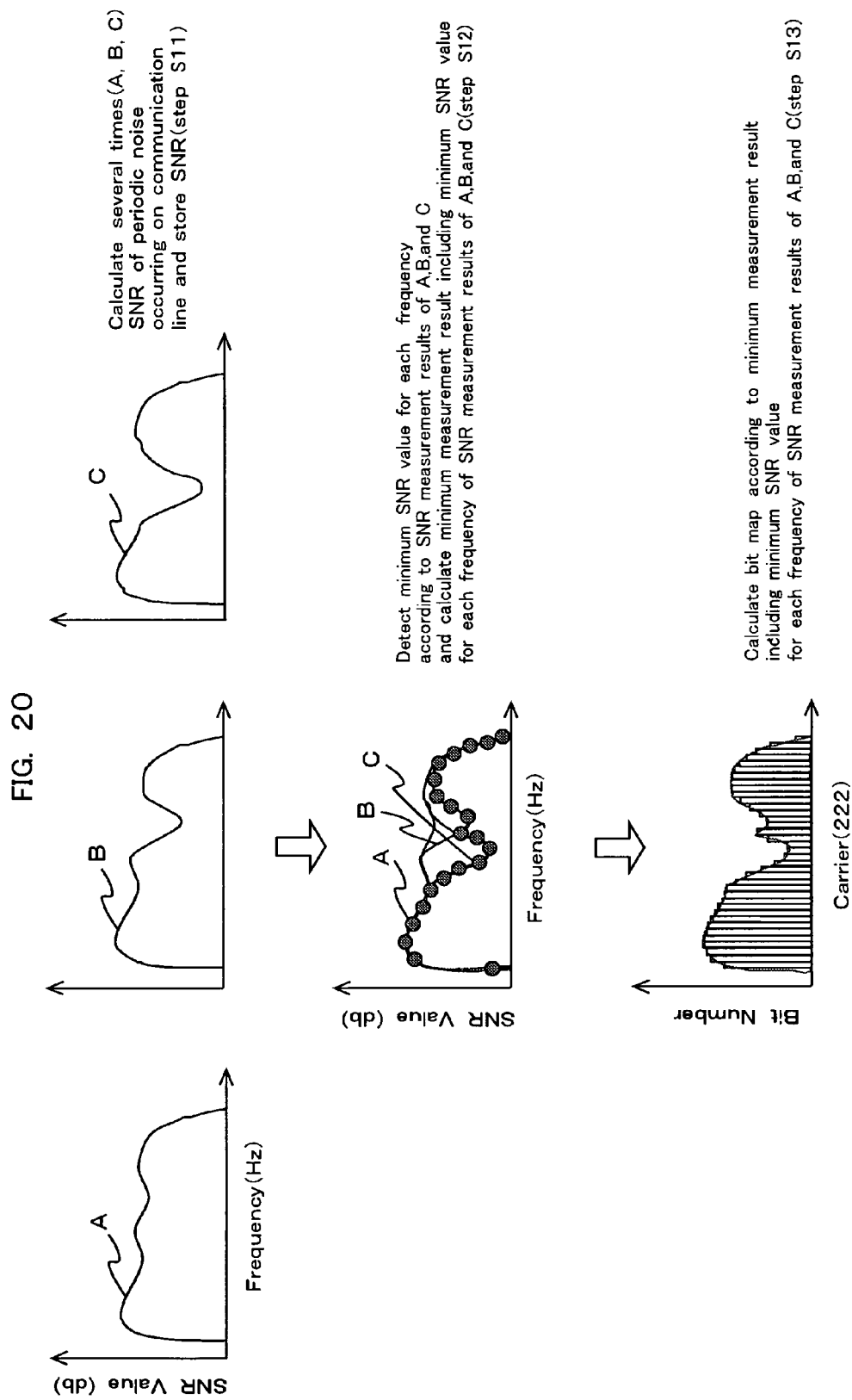
FIG. 20 is graphs to explain operation to calculate an optimal bit map in a second embodiment of a multicarrier transmission system.

In the first embodiment of a multicarrier transmission system, the bit-power distribution ratio calculation module (312, 410) calculates the bit distribution ratios shown in FIGS. 15 to 17 according to the SNR value calculation results of FIG. 12 to 14 stored in the SNR value storage (3122, 4102). However, according to an aspect of the second embodiment of a multicarrier transmission system, the bit-power distribution ratio calculation module (312, 410) detects a minimum SNR value of each frequency according to the SNR value calculation results of FIGS. 12 to 14 stored in the storage (3122, 4102). On the basis of the minimum SNR value detected for each frequency, the system calculates an SNR value including the minimum SNR value of each frequency as SNR value calculation results obtained through plural calculations as shown in FIGS. 12 to 14. Referring now to FIGS. 9, 19, and 20, description will be given of the second embodiment of a multicarrier transmission system. Since the ATU-C 300 and the ATU-R conduct substantially the same operation, description will be given of only the processing for the bit-power distribution ratio calculation module 312 to attain bit distribution ratios.

The SNR calculation module 3121 calculates, as in the first embodiment, the SNR value of each carrier plural times using a transmission signal such as a sync symbol and stores calculation results of SNR values of A, B, and C shown in FIG.

20 in the SNR value storage 3122 (step S11). As a result, the calculation module 3121 stores in the storage 3122 the calculation results of SNR values of FIGS. 12 to 14 obtained through plural calculations.

The optimal bit map calculation module 3123 compares the calculation results of SNR values of A, B, and C of FIG. 20 stored in the SNR value storage 3122 with each other to select a minimum SNR value for each frequency. According to the minimum SNR value of each frequency, the calculation module 3123 calculates a minimum measurement result including the minimum SNR value of each frequency of the measurement results of A, B, and C shown in FIG. 20 (step S12). On the basis of the minimum measurement result obtained in step S12, the calculation module 3123 calculates a bit map of FIG. 18 to be assigned to each carrier for data transmission (step S13).

As above, the optimal bit map calculation unit 3123 selects a minimum SNR value for each frequency using the plural SNR value calculation results shown in FIGS. 12 to 14 to calculate a minimum SNR value measurement result selected for each frequency. On the basis of the minimum SNR value measurement result, the calculation unit 3123 calculates a bit map of FIG. 18. While securing an optimal transmission rate, the calculation unit 3123 calculates an optimal bit map which prevents an even of "error link down" even at occurrence of burst noise.

The calculation unit 3123 then sends the bit map calculation result of FIG. 18 to the demapping module 307 and the mapping module 302. According to the bit map calculation result from the calculation unit 3123 shown in FIG. 18, the modules 307 and 302 transmit data (step S14).

Due to the above operation, even under noisy environment including burst noise, the embodiment of a multicarrier transmission system conducts data transmission using the bit map shown in FIG. 18. The embodiment can guarantee transmission quality of a communication line while securing a high transmission rate.

Third Embodiment

Description will now be given of a third embodiment.

Figure 21:
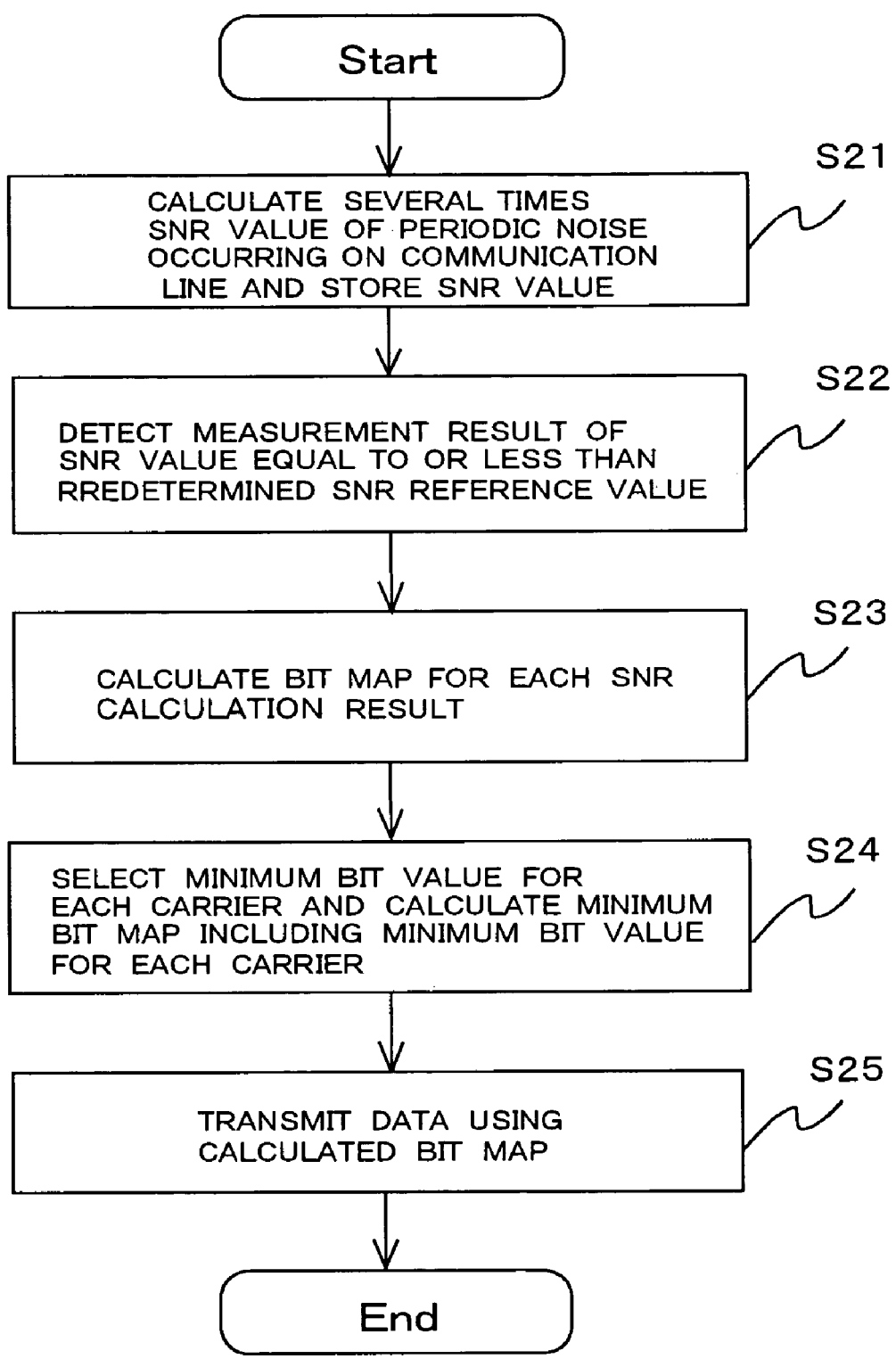
FIG. 21 is a flowchart showing operation to calculate an optimal bit map in a third embodiment of a multicarrier transmission system.
Figure 22:
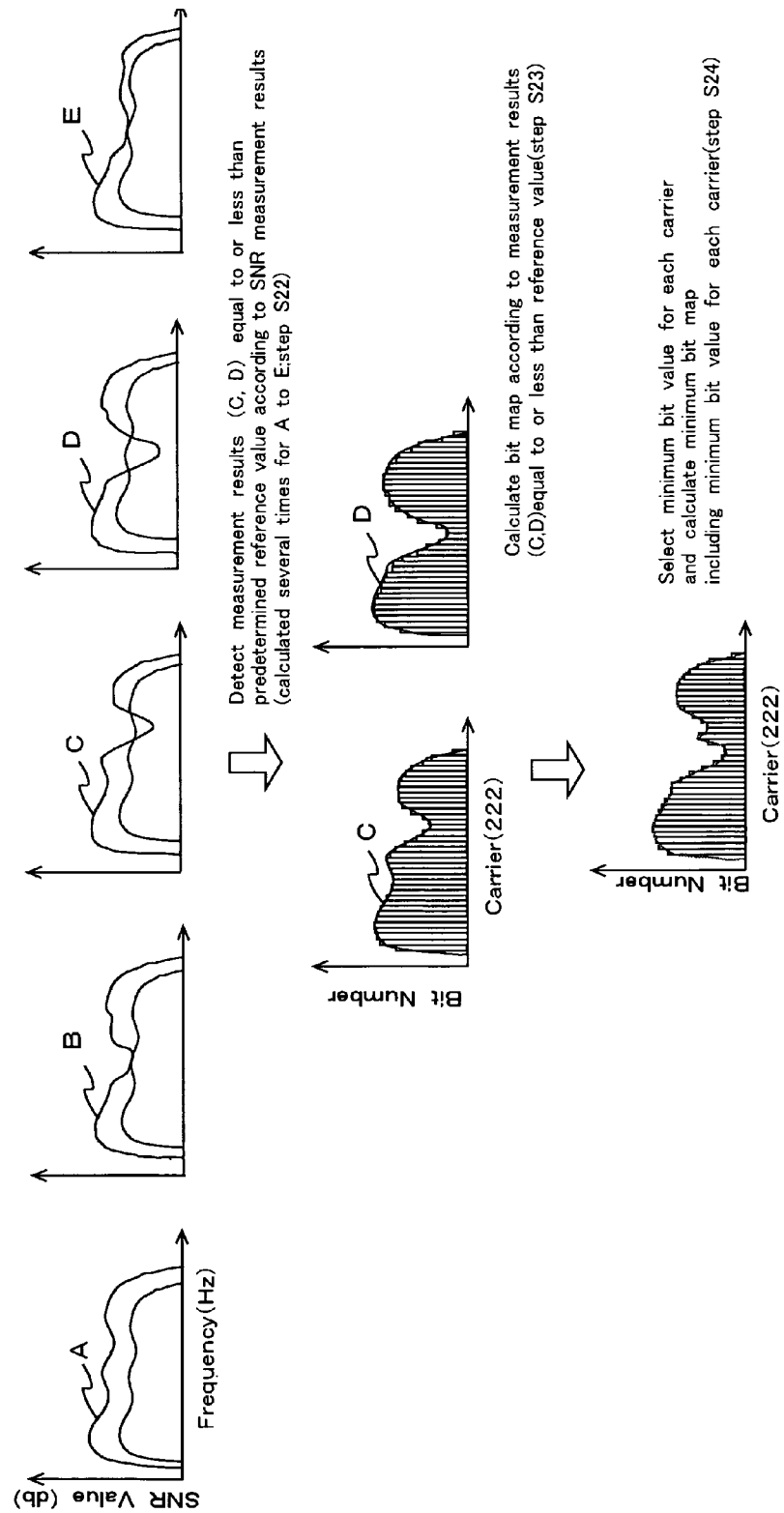
FIG. 22 is graphs to explain operation to calculate an optimal bit map in the third embodiment of a multicarrier transmission system.

The third embodiment has an aspect as below. Using the SNR calculation results attained through plural calculations and stored in the SNR storage 3122 in the first embodiment of a multicarrier transmission system, the third embodiment detects an SNR calculation result including a frequency zone of SNR values equal to or less than a predetermined SNR reference value and calculates an optimal bit map for data transmission as shown in FIG. 18 on the basis of the SNR calculation result thus detected. Referring now to FIGS. 9, 21, and 22, description will be given of the third embodiment of a multicarrier transmission system.

The SNR calculation unit 3121 calculates, as in the first embodiment, the SNR value of each carrier plural times by use of a transmission signal such as a sync symbol and stores calculation results of SNR values of A to E shown in FIG. 22 in the SNR value storage 3122 (step S21).

Using the calculation results of SNR values of A to E of FIG. 22 stored in the storage 3122, the optimal bit map calculation unit 3123 includes an SNR detecting unit 3151/4151 to detect SNR calculation results of C and D of FIG. 22 including a frequency zone of SNR value equal to or less than a predetermined SNR reference value (step S22). As a result, from the calculation results of SNR values obtained through plural calculations and stored in the storage 3122, the calculation unit 3123 can select only calculation results in which the SNR value greatly changes as shown in FIGS. 13 and 14.

On the basis of the calculation results selected as above, the calculation unit 3123 calculates for each calculation result a bit distribution ratio to be assigned to each carrier for data transmission to thereby create bit maps shown in FIGS. 16 and 17 (step S23).

The calculation unit 3123 compares the bit maps of FIGS. 16 and 17 to select a minimum bit value for each carrier. According to the minimum bit value selected for each carrier, the calculation unit 3123 calculates a bit map shown in FIG. 18 (step S24).

As above, from the SNR value calculation results stored in the storage 3122, the optimal bit map calculation unit 3123 selects only calculation results shown in FIGS. 13 and 14 in which the SNR value greatly changes. According to the selected calculation results, the calculation unit 3123 produces the bit maps of FIGS. 16 and 17 to calculate the minimum bit map of FIG. 18 including the minimum bit value of each carrier of the bit map. Resultantly, while securing an optimal transmission rate, it is possible to calculate an optimal bit map which prevents an event of "error link down" even when burst noise takes place. The SNR value as a criterion to select only such calculation results that has considerably changed in the SNR value can be set arbitrarily.

Fourth Embodiment

Next, a fourth embodiment will be described.

Figure 23:
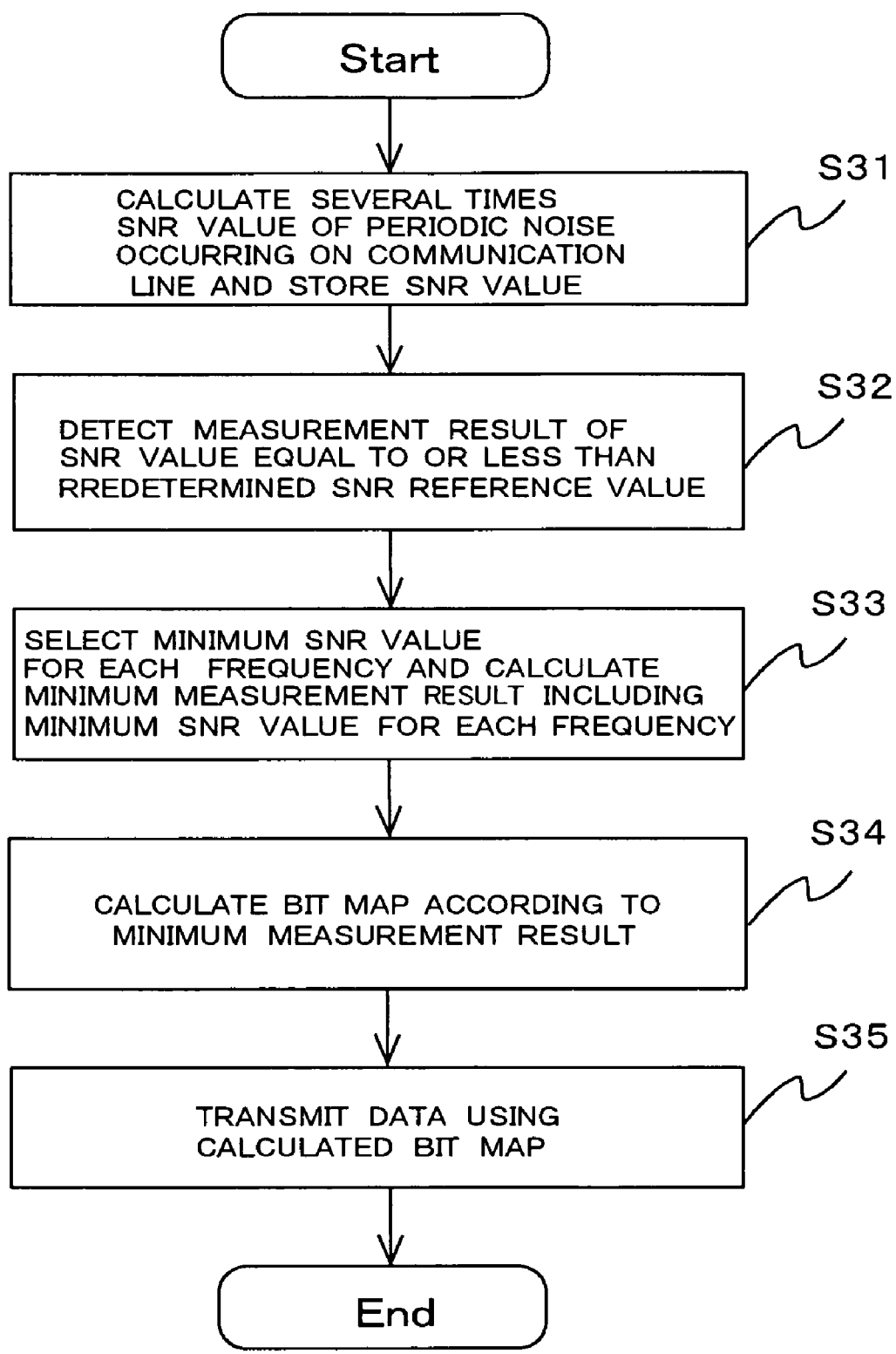
FIG. 23 is a flowchart showing operation to calculate an optimal bit map in a fourth embodiment of a multicarrier transmission system.
Figure 24:
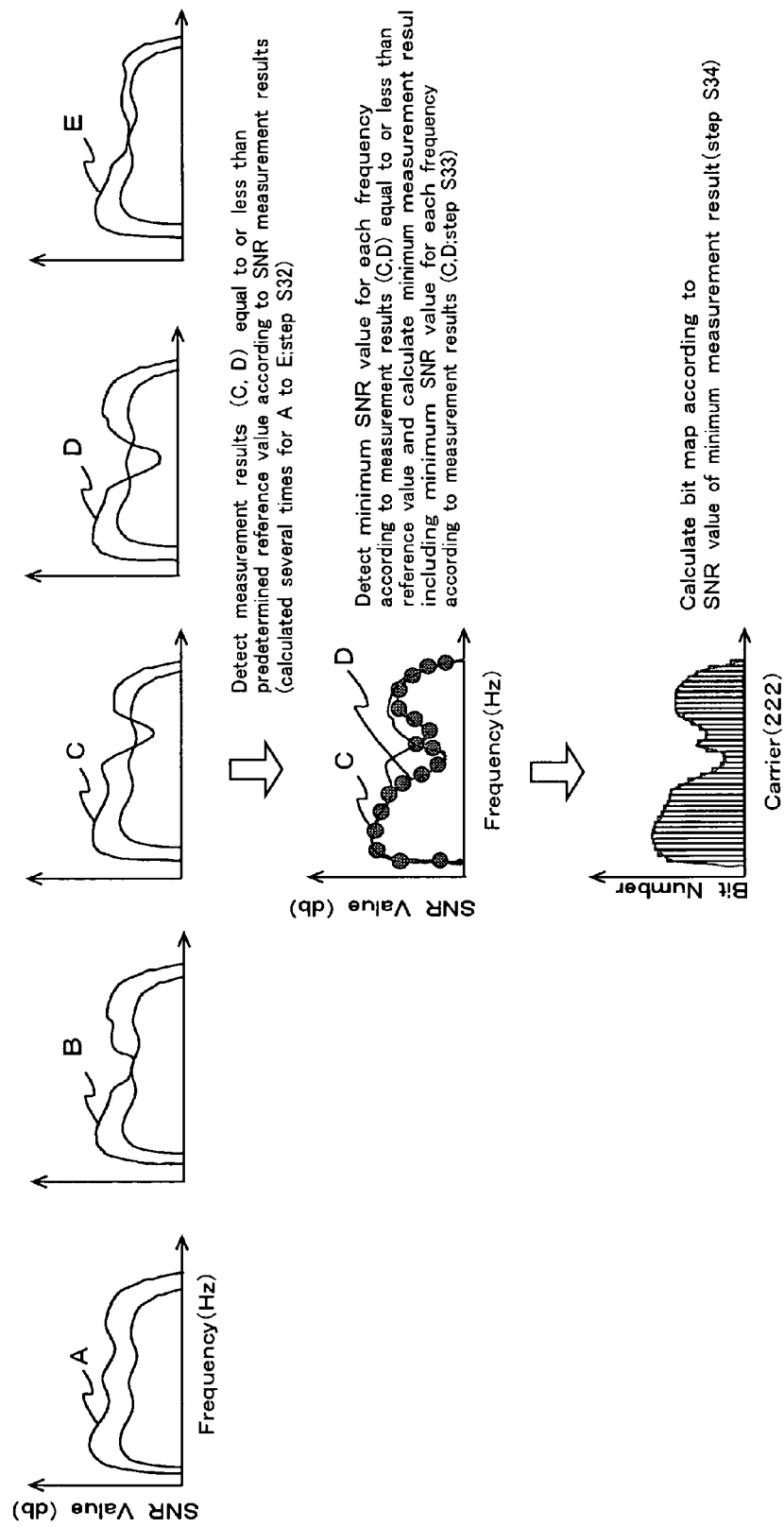
FIG. 24 is graphs to explain operation to calculate an optimal bit map in the fourth embodiment of a multicarrier transmission system.

According to an aspect of the fourth embodiment, by using the SNR calculation results obtained through plural calculations and stored in the SNR storage 3122 in the second embodiment of a multicarrier transmission system, the fourth embodiment detects an SNR calculation result including a frequency zone of SNR values equal to or less than a predetermined SNR reference value to calculate an optimal bit map for data transmission of FIG. 18 according to the SNR calculation result detected as above. Referring next to FIGS. 9, 23, and 24, description will be given of the fourth embodiment of a multicarrier transmission system.

First, the SNR calculation unit 3121 calculates, as in the second embodiment, the SNR value of each carrier plural times using a transmission signal such as a sync symbol and then stores calculation results of SNR values of A to E as shown in FIG. 22 in the SNR value storage 3122 (step S31).

According to the calculation results of SNR values of A to E of FIG. 22 stored in the storage 3122, the optimal bit map calculation unit 3123 detects SNR calculation results of C and D of FIG. 22 which include a frequency zone of SNR value equal to or less than a predetermined SNR reference value (step S32). Resultantly, the calculation unit 3123 can select, from the calculation results of SNR values obtained through plural calculations and stored in the storage 3122, only a calculation result in which the SNR value greatly changes as shown in FIGS. 13 and 14. By use of the calculation results of SNR values, the calculation unit 3123 selects a minimum SNR value for each frequency. On the basis of the minimum SNR value attained for each frequency, the calculation unit 3123 calculates a minimum measurement result including the minimum SNR value of each frequency in the SNR measurement results of FIGS. 13 and 14 (step S33). Using the minimum measurement result including the minimum SNR values, the calculation unit 3123 calculates a bit map shown in FIG. 18 (step S34).

In the fourth embodiment, from the SNR value calculation results attained through plural calculations and stored in the storage 3122, the optimal bit map calculation unit 3123 selects only calculation results of FIGS. 13 and 14 in which the SNR value greatly changes. By comparing the selected SNR calculation results with each other, the calculation unit 3123 determines a minimum SNR value of each frequency to calculate a measurement result of a minimum SNR value selected for each frequency. According to the measurement results of the minimum SNR values, the calculation unit 3123 produces a bit map shown in FIG. 18. That is, the fourth embodiment can calculate, while securing an optimal transmission rate, an optimal bit map which suppresses an event of "error link down" even at occurrence of burst noise. It is possible to arbitrarily set the SNR value as a reference value to select only the calculation results in which the SNR value greatly changes.

Fifth Embodiment

Subsequently, description will be given of a fifth embodiment.

In the third and fourth embodiments of a multicarrier transmission system, the optimal bit map calculation module 3123 detects, from the SNR value calculation results obtained through a plurality of calculations and stored in the SNR value storage 3122, only the calculation results of FIGS. 13 and 14 in which the SNR value greatly changes. In contrast therewith, the fifth embodiment of a multicarrier transmission system has an aspect in which the SNR calculation unit 3123 stores in the storage 3122 only the SNR value calculation results of FIGS. 13 and 14 where the SNR value considerably changes. Referring now to FIGS. 9 and 25, description will be given of the fifth embodiment of a multicarrier transmission system.

The SNR calculation unit 3121 first calculates the SNR value of each carrier for each noise level using a transmission signal such as a sync symbol to create an SNR calculation result for each noise level. The calculation unit 3121 then compares the SNR calculation result for each noise level with an SNR reference result obtained using an SNR reference value for each noise level to determine presence or absence of an SNR value, which is equal to or less than the SNR reference value, in the SNR calculation results for the respective noise levels. The calculation unit 3121 detects only SNR calculation results of C and D of FIG. 25 including frequency zones including SNR values equal to or less than the SNR reference value. The SNR calculation unit 3121 stores in the storage 3122 only the SNR calculation results of C and D of FIG. 25 detected as above (step S41).

As described above, in the fifth embodiment, all SNR value calculation results of A to E of FIG. 25 calculated by the SNR calculation unit 3121 are not stored in the SNR value storage 3122, but only the SNR value calculation results of C and D of FIG. 25 in which the SNR value greatly changes are stored in the storage 3122. That is, the calculation unit 3121 stores only the SNR value calculation results that considerably changes in the SNR value in the storage 3122. This reduces the amount of information of the SNR value calculation results written in the storage 3122 to resultantly reduce the storage capacity of the storage 3122.

According to the calculation results of SNR values of C and D of FIG. 25 stored in the storage 3122, the optimal bit map calculation unit 3123 selects a minimum SNR value of each frequency. Using the minimum SNR value of each frequency, the calculation unit 3123 calculates a minimum measurement result including the minimum SNR value of each frequency in the SNR measurement results of C and D of FIG. 25 (step S42). Consequently, the calculation unit 3123 calculates the minimum measurement result on the basis of only the SNR value calculation results where the SNR changes considerably as shown in FIGS. 13 and 14 and which are stored in the SNR value storage 3122. That is, the minimum measurement result is calculated using a smaller amount of information of SNR value calculation results and hence the calculation unit 3123 can calculate the minimum measurement result in a shorter period of time. According to the minimum SNR value measurement result, the calculating unit 3123 calculates a bit map shown in FIG. 18 (step S43).

The optimal bit map calculation module 3123 calculates, according to the SNR value calculation results in which the SNR value greatly changes as shown in FIGS. 13 and 14 and which are stored in the SNR value storage 3122, bit distribution ratios to be assigned to each carrier for data transmission for each of the calculation results to thereby produce bit maps shown in FIGS. 16 and 17. Therefore, the calculation module 3123 can calculate the bit map using a smaller amount of information of SNR value calculation results.

The calculation module 3123 compares the bit maps shown in FIGS. 16 and 17 with each other to select a minimum bit value for each carrier and calculates the bit map of FIG. 18 on the basis of the minimum bit value for each carrier.

Sixth Embodiment

Description will now be given of a sixth embodiment.

In the first embodiment of a multicarrier transmission system, the optimal bit map calculation module 3123 compares bit maps to select a minimum bit value for each carrier to calculate a bit map of FIG. 18 according to the minimum bit value for each carrier. In contrast with the first embodiment, according to an aspect of the sixth embodiment of a multicarrier transmission system, when the optimal bit map calculation module 3123 determines that difference (error) between the minimum bit value selected for each carrier and a mean value of a plurality of bit values in the carrier is equal to or more than a predetermined value, a predetermined value is added to the minimum bit value of the carrier to thereby correct the minimum bit value. Referring next to FIG. 26, description will be given of the sixth embodiment of a multicarrier transmission system.

In the sixth embodiment, the optimal bit map calculation module 3123 compares the calculation results of A, B, and C calculated in step S2 of the first embodiment shown in FIG. 9 with each other to select a minimum bit value for each carrier. According to the minimum bit value selected for each carrier, the calculation module 3123 obtains a minimum bit map including the minimum bit values respectively of A, B, and C. In the sixth embodiment, for example, as can be seen from FIG. 26, in an operation to compare bit values b1, b2, and b3 of A, B, and C of the carrier a with each other to select a bit value b3 as the minimum bit value, when it is determined that difference (error) between the selected minimum bit value b3 and a mean bit value b(=(b1+b2+b3)/3) of the bit values b1, b2, and b3 of A, B, and C is equal to or more than a predetermined value $\alpha$, i.e., $|b-a/3| \geq \alpha$, in the correcting unit 3050/4150, a predetermined value $\beta$ is added to the minimum bit value b/3 for the carrier a (i.e., b3+$\beta$) to resultantly correct the minimum bit value b3.

As above, in the selection of the minimum bit value for each carrier in the sixth embodiment, when only the selected minimum bit value is remarkably different from other bit values of the bit map calculation result, the minimum bit value is corrected by the correcting unit 3050/4150 to calculate the bit map. Therefore, it is possible to reduce the error in the optimal bit map calculation result as the final calculation result. The predetermined values $\alpha$ and $\beta$ can be arbitrarily set. In the sixth embodiment, when it is determined that difference (error) between the minimum bit value b3 selected for each carrier and a mean bit value b for the carrier a is equal to or more than a predetermined value α, a predetermined value β is added to the minimum bit value b3, in the correcting unit 3050/4150. However, it is also possible to configure the system as below. When it is determined that difference (error) between the minimum bit value b3 selected for each carrier and a mean bit value b for the carrier a is equal to or more than a predetermined value α, the system selects a mean bit value b for the carrier a.

Seventh Embodiment

Next, description will be given of a seventh embodiment.

In the second embodiment of a multicarrier transmission system, the optimal bit map calculation module 3123 compares the calculation results of SNR values with each other to select a minimum SNR value of each frequency. According to the minimum SNR value of each frequency, the calculation module 3123 calculates a minimum measurement result including the minimum SNR value of each frequency of the plural SNR value measurement results. However, according to an aspect of the seventh embodiment of a multicarrier transmission system, when it is determined that difference (error) between a minimum SNR value selected for each frequency and a mean value of a plurality of SNR values for the frequency is equal to or more than a predetermined value, a predetermined value is added to the minimum SNR value of the frequency to correct the minimum SNR value. Referring next to FIG. 27, description will be given of the seventh embodiment of a multicarrier transmission system.

In the seventh embodiment, the optimal bit map calculation module 3123 compares the calculation results of SNR values of A, B, and C obtained in step S11 of the second embodiment shown in FIG. 19 with each other to select a minimum bit value of each frequency. On the basis of the minimum bit value selected for each frequency, the calculation module 3123 calculates a minimum measurement result including the minimum bit values respectively of SNR values of A, B, and C. In the seventh embodiment, for example as shown in FIG. 27, in an operation to compare the SNR values c1, c2, and c3 of A, B, and C of the frequency a with each other to select an SNR value c3 as the minimum SNR value, when it is determined that difference (error) between the selected minimum SNR value c3 and a mean SNR value c(=(c1+c2+c3)/3) of the SNR values c1, c2, and c3 of A, B, and C of the frequency a is equal to ore more than a predetermined value α(|c−c3|≧α), a predetermined value β is added to the minimum SNR value c3 for the frequency a (i.e., c3+β) to correct the minimum SNR value c3.

As above, according to the seventh embodiment, in the selection of the minimum SNR value for each frequency, when only the selected minimum SNR value is considerably different from SNR values of the other SNR calculation results, the minimum SNR value is corrected to calculate the SNR measurement result. Consequently, it is possible to reduce the error in a final optimal bit map calculation result. The predetermined values α and β can be arbitrarily designated. In the seventh embodiment, when it is determined that the minimum SNR value c3 selected for each frequency differs from a mean SNR value c for the frequency a by at least a predetermined value α, a predetermined value β is added to the minimum SNR value c3 for the frequency a. However, the system may be configured such that when it is determined that the minimum SNR value c3 selected for the frequency a differs from a mean SNR value c for the frequency a by at least a predetermined value α, the system selects the mean SNR value c for the frequency a.

Eighth Embodiment

Description will now be given of an eighth embodiment.

Figure 28:
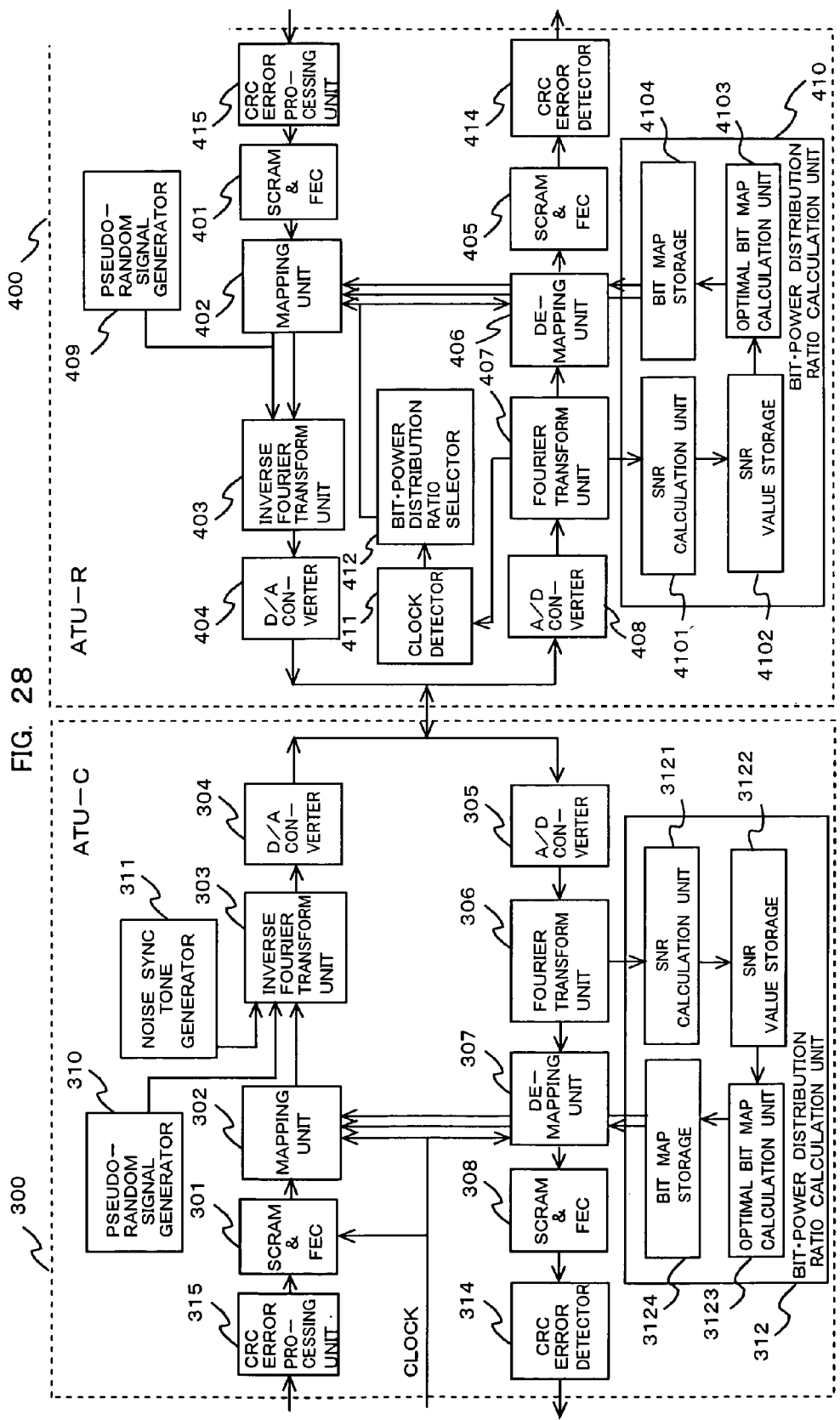
FIG. 28 is a block diagram showing a system configuration of an eighth embodiment of a multicarrier transmission system.

The eighth embodiment of a multicarrier transmission system has an aspect that the embodiment includes a bit map storage (3124, 4104) to store an optimal bit map for data transmission calculated by the optimal bit map calculation unit (3123, 4103) as shown in FIG. 28. In the configuration, the bit map calculated by the calculation unit (3123, 4103) is not directly sent to the demapping module (307, 406) and the mapping module (302, 402), but is stored in the bit map storage (3124, 4104) so that the bit map stored in the bit map storage (3124, 4104) is delivered to the demapping module (307, 406) and the mapping module (302, 402). It is consequently possible to store the bit map calculated by the calculation unit (3123, 4103) in the bit map storage (3124, 4104) such that the bit map stored in the bit map storage (3124, 4104) is read therefrom when necessary and is sent to the demapping module (307, 406) and the mapping module (302, 402) for subsequent use thereof.

Description has been given of embodiments in accordance with the present invention. However, the present invention is not restricted by the embodiments. It is possible to modify and to change the embodiments within a scope of the present invention. Although description has been given of, for example, an ADSL system in conjunction with the embodiments, the present invention is also applicable to a Symmetric Digital Subscriber Line (SDSL), a High speed Digital Subscriber Line (FDSL), and a Very high speed Digital Subscriber Line (VDSL). The embodiments of an ADSL transmission system are not limited to a crosstalk noise environment in which a TCM-ISDN is adjacent to a line of the ADSL system, but are also applicable to other noise environments.

The multicarrier transmission apparatus and the multicarrier transmission method in accordance with the present invention are applicable to all transmission systems which conduct processing of data communication.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A multicarrier transmission apparatus for transmitting data using a bit distribution ratio, comprising:
   a bit distribution ratio calculating unit comprising an SNR calculation unit and a minimum bit distribution ratio calculating unit;
   the SNR calculation unit for calculating a Signal to Noise Ratio (SNR) of periodic noise on a communication line,
   the minimum bit distribution ratio calculating unit for calculating the bit distribution ratio to be assigned to each carrier for data transmission according to a calculation result of the SNR calculated by the SNR calculation unit, and for comparing a plurality of bit distribution ratios calculated by the bit distribution ratio calculating unit with each other to thereby detect a minimum bit value for each carrier, and calculating, on the basis of the minimum bit value of each carrier detected by the minimum bit distribution ratio calculating unit, a minimum bit distribution ratio including minimum bit values of all carriers; and a transmitting unit for transmitting said data using the minimum bit distribution ratio calculated by the minimum bit distribution ratio calculating unit.

2. The multicarrier transmission apparatus in accordance with claim 1, wherein the SNR calculation unit measures the SNR every predetermined period of time using a transmission signal.

3. The multicarrier transmission apparatus in accordance with claim 1, wherein
the minimum bit distribution ratio calculating unit includes an SNR detecting unit for detecting, from the measurement results of the SNR measured by the SNR measuring unit, measurement results of the SNR including a frequency band in which an SNR value equal to or less than a predetermined SNR reference value, and
the minimum bit distribution ratio calculating unit calculates the bit distribution ratio to be assigned to each cater for data transmission according to the measurement results of the SNR detected by the SNR detecting unit.

4. The multicarrier transmission apparatus in accordance with claim 3, wherein
the bit distribution ratio calculating unit further comprises a storage unit for storing the measurement results of the SNR detected by the SNR calculation unit, and
the minimum bit distribution ratio calculating unit calculates the bit distribution ratio to be assigned to each cater for data transmission according to the measurement results of the SNR stored in the storage unit.

5. The multicarrier transmission apparatus in accordance with claim 1, wherein
the minimum bit distribution ratio calculating unit includes a correcting unit for adding a predetermined value to the minimum bit value of each cater to thereby correct the minimum bit value when it is determined that a difference between the minimum bit value detected for each carrier and a mean value of a plurality of bit values in the carrier is equal to or more than a predetermined value.

6. The multicarrier transmission apparatus in accordance with claim 1, wherein
the bit distribution ratio calculating unit further comprises a minimum bit distribution ratio storage unit for storing the minimum bit distribution ratio calculated by the minimum bit distribution ratio calculating unit, and
the transmitting unit transmits said data using the minimum bit distribution ratio stored in the minimum bit distribution ratio storage unit.

7. A multicarrier transmission apparatus for transmitting data using a bit distribution ratio, comprising:
a measurement result calculating unit comprising an SNR calculation unit and a minimum bit distribution ratio calculating unit;
the SNR calculation unit for calculating a Signal to Noise Ratio (SNR) of periodic noise on a communication line,
the minimum bit distribution ratio calculating unit for comparing a plurality of calculation results of the SNR calculated by the SNR calculation unit with each other to thereby detect a minimum SNR value for a plurality of frequencies and calculating, on the basis of the minimum SNR value for the plurality of frequencies detected by the measurement result calculating unit, a minimum measurement result including minimum SNR values of all of the plurality of frequencies, and for calculating, on the basis of the minimum measurement result calculated by the minimum bit distribution ratio calculating unit, a minimum bit distribution ratio to be assigned to each cater for data transmission; and
a transmitting unit for transmitting said data using the minimum bit distribution ratio calculated by the minimum bit distribution ratio calculating unit.

8. The multicarrier transmission apparatus in accordance with claim 7, wherein the SNR calculation unit measures the SNR every predetermined period of time using a transmission signal.

9. The multicarrier transmission apparatus in accordance with claim 7, wherein
the minimum bit distribution ratio calculating unit includes an SNR detecting unit for detecting, from the measurement results of the SNR measured by the SNR measuring unit, measurement results of the SNR including a frequency band in which an SNR value equal to or less than a predetermined SNR reference value, and
the minimum bit distribution ratio calculating unit compares a plurality of measurement results of the SNR detected by the SNR detecting unit with each other to thereby detect the minimum SNR value for the plurality of frequencies and calculates, on the basis of the minimum SNR value for the plurality of frequencies detected by the measurement result calculating unit, the minimum measurement result including minimum SNR values of the plurality of frequencies.

10. The multicarrier transmission apparatus in accordance with claim 9, wherein
the measurement result calculating unit further comprises a storage unit for storing the measurement results of the SNR detected by the SNR calculation unit, and
the minimum bit distribution ratio calculating unit compares a plurality of measurement results of the SNR stored in the storage unit with each other to thereby detect the minimum SNR value for the plurality of frequencies and calculates, on the basis of the minimum SNR value of each carrier detected by the measurement result calculating unit, the minimum measurement result including minimum SNR values of the plurality of frequencies.

11. The multicarrier transmission apparatus in accordance with claim 7, wherein
the minimum bit distribution ratio calculating unit includes a correcting unit for adding a predetermined SNR value to the minimum SNR value for the plurality of frequencies to thereby correct the minimum SNR value when it is determined that a difference between the minimum SNR value detected for the plurality of frequencies and a mean value of a plurality of the SNR values in the frequency is equal to or more than a predetermined value.

12. The multicarrier transmission apparatus in accordance with claim 7, wherein
the measurement result calculating unit further comprises a minimum bit distribution ratio storage unit for storing the minimum bit distribution ratio calculated by the minimum bit distribution ratio calculating unit, and
the transmitting unit transmits said data using the minimum bit distribution ratio stored in the minimum bit distribution ratio storage unit.

13. A multicarrier transmission method for use with a multicarrier transmission apparatus for transmitting data using a bit distribution ratio, wherein the multicarrier transmission apparatus includes a bit distribution ratio calculating unit and a transmitting unit wherein the bit distribution ratio calculating unit includes a SNR calculation unit and a minimum bit distribution ratio calculating unit, comprising the steps to be performed by the multicarrier transmission apparatus, the steps including:

an SNR calculating step of calculating a Signal to Noise Ratio (SNR) of periodic noise on a communication line, the SNR being determined by the SNR calculation unit;

a minimum bit distribution ratio calculating step of calculating the bit distribution ratio to be assigned to each cater for data transmission according to a calculation result of the SNR calculated by the SNR calculation step, the bit distribution ratio being determined by the minimum bit distribution ratio calculating unit;

the minimum bit distribution ratio calculating step of comparing a plurality of bit distribution ratios calculated by the bit distribution ratio calculating step with each other to thereby detect a minimum bit value for each carrier, and calculating, on the basis of the minimum bit value of each cater detected by the minimum bit distribution ratio calculating step, a minimum bit distribution ratio including minimum bit values of all carriers, the minimum bit distribution ratio being determined by the minimum bit distribution ratio calculating unit; and a transmitting step of transmitting said data using the minimum bit distribution ratio calculated by the minimum bit distribution ratio calculating step, the data being transmitted by the transmitting unit.

14. The multicarrier transmission method in accordance with claim 13, wherein the SNR calculating step calculates the SNR every predetermined period of time using a transmission signal.

15. The multicarrier transmission method in accordance with claim 13, wherein the minimum bit distribution ratio calculating step includes an SNR detecting step of detecting by the multicarrier transmission apparatus, from the measurement results of the SNR calculated by the SNR calculating step, calculation results of the SNR including a frequency band in which an SNR value equal to or less than a predetermined SNR reference value, and the minimum bit distribution ratio calculating step calculates the bit distribution ratio to be assigned to each carrier for data transmission according to the measurement results of the SNR detected by the SNR detecting step.

16. The multicarrier transmission method in accordance with claim 15, wherein the bit distribution calculating unit includes a storing step for storing in a storage of the transmission apparatus by the multicarrier transmission apparatus the measurement results of the SNR calculated by the SNR calculating step, wherein the minimum bit distribution ratio calculating step calculates bit distribution ratio to be assigned to each carrier for data transmission according to the measurement results of the SNR stored in the storage.

17. The multicarrier transmission method in accordance with claim 13, wherein the minimum bit distribution ratio calculating step includes a correcting step of adding by the multicarrier transmission apparatus, when it is determined that difference between the minimum bit value detected for each carrier and a mean value of a plurality of bit values in the carrier is equal to or more than a predetermined value, a predetermined value to the minimum bit value of each carrier to thereby correct the minimum bit value.

18. The multicarrier transmission method in accordance with claim 13, wherein the bit distribution ratio calculating step includes a minimum bit distribution ratio storing step of storing in a storage of transmission apparatus by the multicarrier transmission apparatus the minimum bit distribution ratio calculated by the minimum bit distribution ratio calculating step, and data is transmitted using the minimum bit distribution ratio stored in the storage.

19. A multicarrier transmission method for use with a multicarrier transmission apparatus for transmitting data using a bit distribution ratio, wherein the multicarrier transmission apparatus includes a measurement result calculating unit and a transmitting unit wherein the measurement result calculating unit includes a SNR calculation unit and a minimum bit distribution ratio calculating unit, comprising the steps to be performed by the multicarrier transmission apparatus, the steps including:

an SNR calculating step of calculating a Signal to Noise Ratio (SNR) of periodic noise occurring on a communication line, the SNR being determined by the SNR calculation unit;

a minimum bit distribution ratio calculating step of comparing a plurality of calculation results of the SNR calculated by the SNR calculating step with each other to thereby detect a minimum SNR value for the plurality of frequencies and calculating, on the basis of the minimum SNR value of each cater detected by the minimum bit distribution ratio calculating step, a minimum measurement result including the minimum SNR value of the plurality of frequencies, the bit distribution ratio being determined by the minimum bit distribution ratio calculating unit;

the minimum bit distribution ratio calculating step of calculating, on the basis of the minimum measurement result calculated by the measurement result calculating step, a minimum bit distribution ratio to be assigned to each carrier for data transmission, the minimum bit distribution ratio being determined by the minimum bit distribution ratio calculating unit; and a transmitting step for transmitting said data using the minimum bit distribution ratio calculated by the minimum bit distribution ratio calculating step, the data being transmitted by the transmitting unit.

20. The multicarrier transmission method in accordance with claim 19, wherein the SNR calculating step calculates the SNR every predetermined period of time using a transmission signal.

21. The multicarrier transmission method in accordance with claim 19, wherein the minimum bit distribution ratio calculating step includes an SNR detecting step for detecting by the multicarrier transmission apparatus, from the measurement results of the SNR calculated by the SNR calculating step, calculation results of the SNR including a frequency band in which an SNR value equal to or less than a predetermined SNR reference value, and the minimum bit distribution ratio calculating step compares the plurality of measurement results of the SNR detected by the SNR detecting step with each other to thereby detect the minimum SNR value for the plurality of frequencies and calculates, on the basis of the minimum SNR value for the plurality of frequencies detected by the minimum bit distribution ratio calculating step, the minimum measurement result including minimum SNR value of the plurality of frequencies.

22. The multicarrier transmission method in accordance with claim 21, wherein the minimum bit distribution ratio calculating step includes a storing step for storing in a storage of the transmission apparatus by the multicarrier transmission apparatus the measurement results of the SNR calculated by the SNR calculating step, wherein the minimum bit distribution ratio calculating step compares the plural measurement results of the SNR stored in the storage with each other to thereby detect the minimum SNR value for the plurality of frequencies and calculates, on the basis of the minimum SNR value for the plurality of frequencies detected by the minimum bit distribution ratio calculating step, the minimum measurement result including minimum value of the plurality of frequencies.

23. The multicarrier transmission method in accordance with claim 19, wherein the minimum bit distribution ratio calculating step includes a correcting step of adding by the multicarrier transmission apparatus, when it is determined that difference between the minimum SNR value detected for the plurality of frequencies and a mean value of a plurality of the SNR values in the frequency is equal to or more than a predetermined value, a predetermined SNR value to the minimum SNR value for the plurality of frequencies thereby correct the minimum SNR value.

24. The multicarrier transmission method in accordance with claim 19, further comprising wherein the measurement result calculating step includes a minimum bit distribution ratio storing step of storing in a storage of transmission apparatus by the multicarrier transmission apparatus the minimum bit distribution ratio calculated by the minimum bit distribution ratio calculating step, and data is transmitted using the minimum bit distribution ratio stored in the storage.

* * * * *